United States Patent
Mutoh

(10) Patent No.: US 7,414,639 B2
(45) Date of Patent: Aug. 19, 2008

(54) IMAGE PROCESSING APPARATUS, IMAGE PROCESSING METHOD AND PROGRAM

(75) Inventor: Gennosuke Mutoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 58 days.

(21) Appl. No.: 10/616,148

(22) Filed: Jul. 9, 2003

(65) Prior Publication Data
US 2004/0057634 A1 Mar. 25, 2004

(30) Foreign Application Priority Data

| Jul. 10, 2002 | (JP) | ............................. 2002-201612 |
| Oct. 28, 2002 | (JP) | ............................. 2002-312183 |
| Jun. 5, 2003 | (JP) | ............................. 2003-160942 |

(51) Int. Cl.
*G06T 3/40* (2006.01)

(52) U.S. Cl. ...................................... 345/667; 358/1.2

(58) Field of Classification Search ................ 345/611, 345/667–671; 358/1.2, 451, 528; 382/298–301; 385/298–301
See application file for complete search history.

(56) References Cited

U.S. PATENT DOCUMENTS

| 5,161,035 A | 11/1992 | Muramatsu et al. |
| 5,185,817 A | 2/1993 | Degi et al. |
| 5,270,836 A | 12/1993 | Kang |
| 5,553,201 A * | 9/1996 | Muramatsu .................. 358/1.2 |
| 5,901,274 A | 5/1999 | Oh et al. |
| 6,219,465 B1 | 4/2001 | Nacman et al. |
| 6,453,074 B1 * | 9/2002 | Zheng ........................ 382/299 |
| 6,510,254 B1 * | 1/2003 | Nakami et al. .............. 382/300 |
| 6,674,551 B1 | 1/2004 | Takura |
| 6,678,072 B1 * | 1/2004 | Matsuoka et al. ............ 358/1.2 |
| 6,836,571 B1 | 12/2004 | Hirn |
| 2002/0081034 A1 | 6/2002 | Yamada |
| 2005/0008258 A1 * | 1/2005 | Suzuki et al. ............... 382/298 |

FOREIGN PATENT DOCUMENTS

| EP | 0998121 A | 5/2000 |
| EP | 1034511 A | 9/2000 |
| JP | 05233789 | 9/1993 |
| JP | 2000-32256 | 1/2000 |
| JP | 2001188900 | 7/2001 |

OTHER PUBLICATIONS

Adobe PDF File Concepts, (Portable Document Format), Sep. 16, 2002, Training Department—PAWB, pp. 1-6, http://www.pawb.uscourts.gov/pdfs/pdfprint.pdf.*

Takashi Kawasaki, "Image Enlargement Methods," 45th Monthly Rollout of Intellectual System Design Laboratory, pp. 9-11.

Jul. 19, 2007 official action in connection with European Patent Application No. 03 254 381.1.

* cited by examiner

*Primary Examiner*—Jeffery A. Brier
(74) *Attorney, Agent, or Firm*—Cooper & Dunham, LLP

(57) ABSTRACT

An image processing apparatus for changing the size of image data of an original image, includes: a comparison part comparing an image information value which indicates predetermined image information of the original image, with a corresponding predetermined reference value which is previously set for each of the predetermined image information; and a sharing-ratio determining part which, based on a comparison result of the comparison part, determines a sharing ratio in processing for changing the size of the image data between a first processing way and a second processing way different from the first processing way.

54 Claims, 20 Drawing Sheets

Priort Art

Prior Art
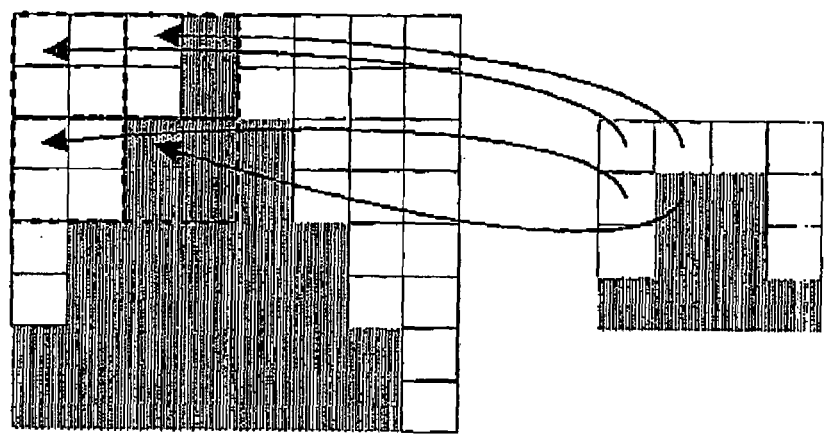
FIG.6A → FIG.6B
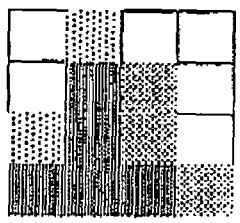
FIG.6C

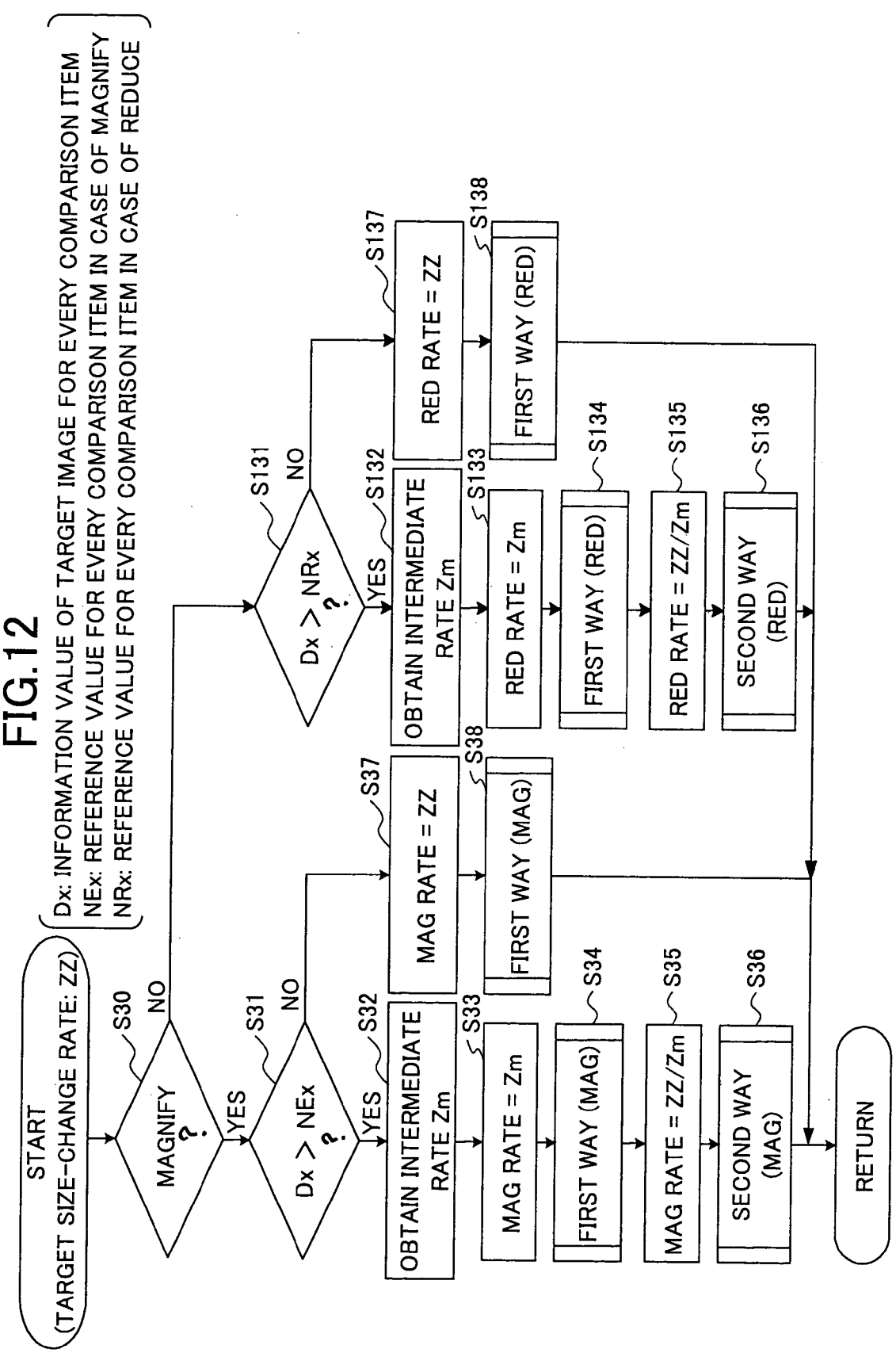

FIG.13B
AFTER MAGNIFICATION
(NUMERAL SHOWN IN BOX INDICATES THE NUMBER OF PIXEL BEFORE MAGNIFICATION SELECTED BY CALCULATION)
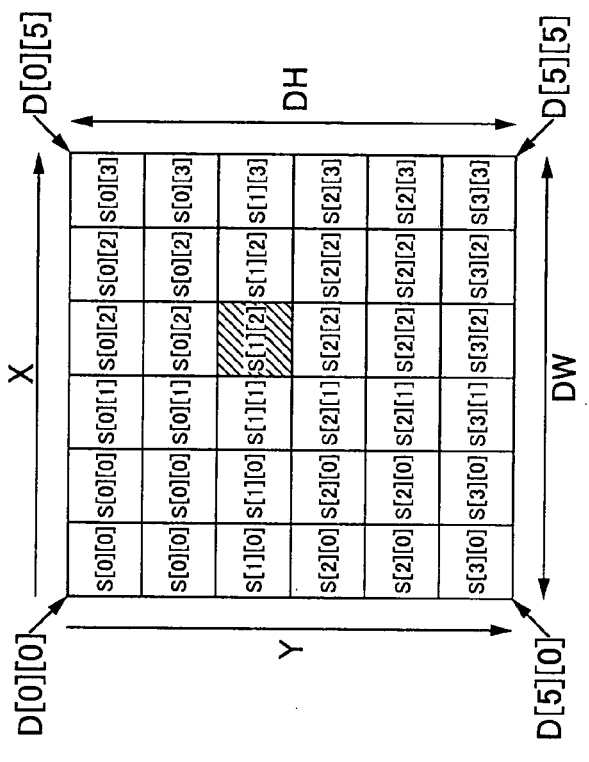
FIG.13A
BEFORE MAGNIFICATION
(S[POSITION ALONG VERTICAL DIRECTION] [POSITION ALONG HORIZONTAL DIRECTION])
IN CASE 1.5 TIMES
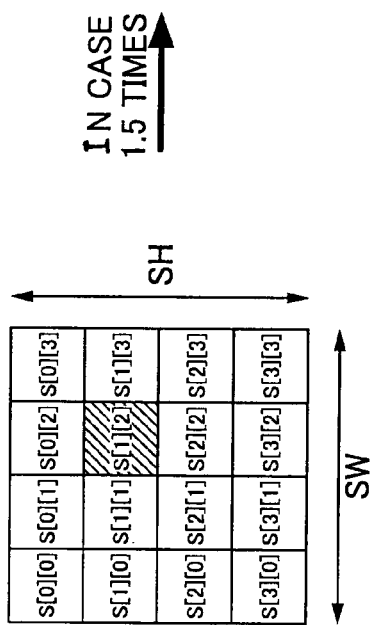
FIG.13C
CALCULATION FOR SELECTING PIXEL
```
for( Y = 0; Y <DH;Y++){
  for( X = 0; X <DW;X++){
    D[Y][X] = S[SH * Y / DH][SW * X / DW];
  }
}
```

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method, and a program by which an image processing, such as an image size-change processing or so can be performed on digital image data of an original image efficiently.

2. Description of the Related Art

Usually, with an image processing apparatus, such as a copying machine or a printer, an image is output or printed out after being changed in its size in many cases. For example, when printing out a photographic image taken with a digital camera via a printer, generally a change in size into an image suitable for the size of a printing paper may be performed.

A case where magnification processing (or enlargement processing) in which the number of pixels of an original image is increased will now be discussed, for example. For example, as shown in FIG. 1A, an original image which has an outline containing an edge portion of a 45-degree oblique line will now be discussed. In this case, it is assumed that this original image is increased twice in each dimension. That is, each pixel is multiplied into 4 pixels with the pixel value unchanged, for example. In this case, a black pixel 'a' of this figure turns into black pixels a1, a2, a3, and a4 as shown in FIG. 1B. In this case, a so-called jaggy phenomenon well-known occurs in a conspicuous manner as shown in FIG. 1B in which the edge part includes a shape like 'stair steps'.

In order to solve this problem, a so-called jaggy processing may be applied. By this jaggy processing, a jaggy phenomenon such as that mentioned above becomes less conspicuous. FIG. 2 shows a flow chart according to this scheme.

As shown, after inputting an image before a magnification process in this case (Step S1), predetermined image processing is performed (Step S2). In this case, without applying the scheme of simply multiplying each pixel into 4 pixels as mentioned above, a certain operation is performed by using pixel values of pixels surrounding the relevant pixel. Thereby, for example, from the original pixel 'a' shown in FIG. 1A, four pixels a1, a2, a3 and a4 are produced as shown in FIG. 1C. As shown, in this scheme, the pixel 'a' is not simply multiplied into four pixels each being a black pixel, but the thus-produced pixels a1, a2, a3 and a4 are those of one white pixel and other three black pixels. As can be seen clearly from FIGS. 1B and 1C, the jaggy phenomenon becomes less conspicuous accordingly. Thus, the edge part of 45-degree slant becomes smoother as shown in FIG. 1C (i.e., the above-mentioned 'stair steps' are made finer).

Such a jaggy processing which enables the above-mentioned operation is disclosed, for example, by Japanese laid-open patent application No. 2001-188900 filed by the present applicant.

Thus, it is possible by performing jaggy processing, to improve the quality of image of after the magnification. That is, originally the relevant 45-degree slant part is a smooth straight line of in a smooth photographic subject with a 45-degree slant, and, as a result of being taken by a digital camera, such a stair-like jaggy phenomenon occurs due to a quantization error in the digital camera according to a resolution performance thereof. Therefore, it can be said that, when the relevant image is expanded or magnified, the state shown in FIG. 1C is more similar to the original subject image than the state shown in FIG. 1B.

However, in case such a jaggy processing is performed as mentioned above, a certain operation or calculation should be performed for each pixel with reference to peripheral pixels as mentioned above. Accordingly, an extra processing time is needed for processing each pixel. Thereby, a considerable time is needed for processing the entire image consequently.

For a user, it is preferable that an image which expresses a photographic subject more precisely through such jaggy processing. However, in many case, a user also needs a reduction in the processing time taken. That is, in some case, for a user, no jaggy processing should be performed in case a very long processing time is needed therefor even when a resulting printed matter shows a somewhat serious jaggy phenomenon. Especially in a case where the size of original image data is very large, i.e., the data amount thereof is very large, a very long time may be required for the jaggy processing throughout the given image data accordingly. Such a condition may not be necessarily preferable for a user.

In order to solve this problem, a scheme disclosed by Japanese laid-open patent application No. 5-233789 may be applied. According to this scheme, as shown in FIG. 3, a magnification way is selected from among a way of Step S13 or a way of Step S15 for an original image according to a result of comparison of the data amount of the original image with a predetermined reference value (Step S11). However, according to this art, there is a possibility that a difference arises remarkably depending on which of the ways is thus selected from the above-mentioned comparison with respect to a required data processing time, an image quality of the thus-processed image, or so. When the data amount of the original image is in accident very near the above-mentioned reference value, the way to be selected differs according to a very small difference in the data amount, and, then, the required data processing time and/or the image quality of the thus-processed image may differ remarkably.

Such a tendency may become more remarkable with a recent increase in the resolution performance of the image input device or increase in the required image quality. That is, since thereby it becomes possible to input an original image with a large image data size at a high resolution, the data amount to be processed in size-change processing, such as a magnification, a size-reduction, etc. increases accordingly. For this reason, the time required to process the data concerned increases accordingly. When the time needed for the image data processing as a result becomes much larger, a situation which does not necessarily match a requirement of a user may occur with respect to a time which the user can permit.

Similar problem may occur not only in a case of image size magnification but also in a case of image size reduction for digitized image data. In a case of image size reduction, in terms of required data processing time, a way of image size reduction employing, so-called, a simple thinning-out processing may be advantageous. In this scheme, the number of pixels is simply reduced. However, in such a scheme, in which no special concern is made as to a color of each pixel, as to what a relation relating pixels have, or so, essential drawing information such as a thin line drawing may be lost in some case.

Such a problematic situation will now be described in a specific example. For example, a case where an original image of 8×8 pixel configuration shown in FIG. 4A is reduced to a half in size, or a ¼ in area, will now be discussed. In this case, a predetermined one is selected from among each unit of 4 pixels of 2×2, for example, such as those enclosed by broken lines in FIG. 4A, while the other three pixels are ignored. In order to simplify the description, it is assumed that, in an original image shown in FIG. 4A, pixels of halftone dots represent black pixels while pixels of blank squares represent white pixels. That is, as shown, the original image has a horizontal stripe pattern.

In this case, it is also assumed that a law or an algorithm is provided by which the top-left pixel is selected from among the four pixels of each 2×2 pixel unit in size-reduction process. As a result, the thus-size-reduced image is that shown in FIG. 4B. As shown, the image resulting becomes completely different from that before being thus processed shown in FIG. 4A. That is, the horizontal stripe pattern is lost and an entirely black painted image occurs.

FIGS. 5A and 5B shows another example in which the above-mentioned same law/algorithm of size reduction is applied to an original image which is almost the same as that in the example of FIG. 4A. In this case, as shown, on the contrary, the resulting image is of an entirely white painted image. Thus, in case the simple thinning-out-type size reduction is performed, the image resulting becomes completely different in impression only due to a difference in position of image pattern of the original image.

When reducing an image, unlike a case of magnification, the information amount of pixels is reduced absolutely, and, thereby, basically it is not possible to secure 100% of the original data. Accordingly, it is necessary to devise a certain special idea by which the outline of an original image is maintained for the purpose of substantially improving the image quality even through size reduction processing.

FIGS. 6A through 6C illustrate another example of a case the above-mentioned simple thinning-out-type size reduction scheme is applied, and a way of maintaining the outline of an original image. When the size reduction processing according to the simple thinning-out scheme is applied to an original image shown in FIG. 6A, a size-reduced image shown in FIG. 6B is obtained, for example, in which the outline of the original image is clearly damaged. In contrast thereto, a special idea may be applied in which each pixel after reduction is determined with reference to surrounding pixels of a target pixel before reduction. Thereby, a reduced image shown in FIG. 6C is obtained. In FIG. 6C, by utilizing intermediate image tone levels in addition to completely black and white pixels, the outline of the original image is maintained to a certain amount even in the reduced image, as shown.

Thus, by employing a technique of determining a pixel value after reduction processing using information of surrounding pixels, it is possible to maintain the impression of an original image to a some extent even after the reduction processing. However, when such a certain type of advanced image processing is performed and thus a loss of the original image data is substantially avoided as much as possible, the amount of processing required increases also in the reduction processing, and the processing speed will be degraded as in the case of above-mentioned magnification processing as a result.

The above-described art of the Japanese laid-open patent application No. 5-233789 may also be used as a way of solving of the above-mentioned problem, in which, the data amount/size of the original image is compared with a predetermined reference value, and according to the comparison result, a way of image size change applied is selected. However, also in the case of size reduction, with this technology, a remarkable difference may occur in a resulting image quality due to a difference in the way of processing currently selected, as mentioned with reference to FIGS. 6A, 6B and 6C. Also, the same problem as that in a case of image magnification may occur such that the data processing time required and/or data quality obtained differs remarkably due to a small difference in the original data amount in case the data amount is very close to the predetermined reference value.

SUMMARY OF THE INVENTION

The present invention has been devised for solving the above-mentioned problems, whereby an image quality can be maintained as much as possible or original image information can be maintained as much as possible even through such an image size-change processing with a minimum necessary data processing amount required.

Another object of the present invention is to avoid a situation such that, as mentioned above, a difference in various conditions of image processing performed will not result in a remarkable difference in a resulting image quality or a data processing time required.

According to the present invention, in case of performing image size-change processing such as an image size magnification or image size reduction (such a image size-change processing will be simply referred to as a size-change processing), a combination is made between a plurality of image processing ways at a predetermined combination sharing ratio thereamong. The above-mentioned plurality of image processing ways may include a first processing way such as that which includes a relatively high-order or not-simple processing such as a jaggy processing described above in case of size magnification, or an intermediate tone processing such as that mentioned above with reference to FIG. 6C in a case of size reduction, and a second processing way such as that which on the contrary includes relatively simple processing such as a simple pixel multiplication in image size magnification or a simple thinning-out-type size reduction mentioned above with reference to FIGS. 1B, 4B, 5B and 6B. Thereby, it becomes possible to achieve an image data processing for a size change with substantially maintaining the information of an original image as much as possible or maintaining the original image quality, within a predetermined time duration.

Thus, according to the present invention, a comparatively high-order first processing way and a comparatively simple second processing way are applied to an original image together in a manner of combination. In this time, the combination sharing ratio between the first and second processing ways is appropriately set for the original image. The above-mentioned combination sharing ratio is preferably controllable according to given various conditions. Of course, the number of processing ways which are to be applied in a combination manner as mentioned above is not limited to the two, and any other number more than two also can be applied in the same manner.

According to the present invention, it becomes possible to freely control the combination sharing ratio applied according to various conditions given. Thereby, a user can freely alter the above-mentioned combination sharing ratio applied for each case according to conditions which should be satisfied in achieving a desired image data processing, and, thus, it becomes possible to perform the desired image processing with optimum conditions which match the particular requirements given.

According to the present invention, even an original image to be processed has a different characteristic or attribute, by appropriately adjusting the above-mentioned combination sharing ratio applied between the plurality of types of processing ways according to the characteristic or attribute, it becomes possible to achieve execution of the image processing at a best image quality within a fixed processing time required or a fixed processing amount required for the execution, without regard to the characteristic/attribute of the original image.

Furthermore, according to the present invention, based on image information which defines each of a plurality of pixels which are arranged two-dimensionally in an original image, an image size of the original image is changed. One aspect of the present invention includes a comparison part which compares an image information amount which indicates each of various types of image information of an original image, with a predetermined reference value previously set for the respective types of image information; and a selection part which determines an application share ratio between a first processing way and a second processing way, wherein the first processing way is a way of performing a size-change processing, and the second processing way is a way of also performing size-change processing which is different from the first processing way.

In this case, the above-mentioned first processing way is preferably a way of image processing of high-order especially configured to effectively control or reduce image quality degradation which may otherwise occur due to a relevant size-change processing. On the other hand, the above-mentioned second processing way is preferably a simple way of image processing, such as a simple pixel multiplication in case of magnification, or a simple pixel thinning-out the reduction.

Then, the above-mentioned selection part preferably performs the following control operations: In case a time required for achieving all the necessary process to be executed for a predetermined size-change processing only in the above-mentioned first processing way exceeds a predetermined time allowed for the desired size-change rate performed on an original image, the above-mentioned second processing way is also used together with the above-mentioned first processing way in a combination manner. Otherwise, only the first processing way is applied for all the process required. In case the combination manner is applied between the first and second processing ways, a combination sharing ratio is determined, and, thereby, it becomes possible to achieve the size-change processing for the desired size-change rate within the predetermined time allowed.

In one case, the above-mentioned type of information for which the above-mentioned comparison part makes a comparison may be the size-change rate applied in the size-change processing on the original image, the size of the original image, the available number of colors which each pixel can express on the original image, the resolution of the original image, or so.

Other objects and further features of the present invention will become more apparent from the following detailed description when read in conjunction with the accompanying drawings.

BRIEF DESCRIPTION OF THE DRAWINGS

FIGS. 6A, 6B and 6C illustrate one advanced way of image size reduction solving the above-mentioned problem;

FIG. 12 shows an operation flow chart of a first embodiment of an image processing method according to the present invention;

FIGS. 13A, 13B and 13C illustrate a second processing way of size magnification, or a simple pixel multiplication way which can be applied to each embodiment of the present invention;

DESCRIPTION OF THE PREFERRED EMBODIMENTS

Hereinafter, embodiments the present invention will be described in detail with reference to drawings.

Figure 7:
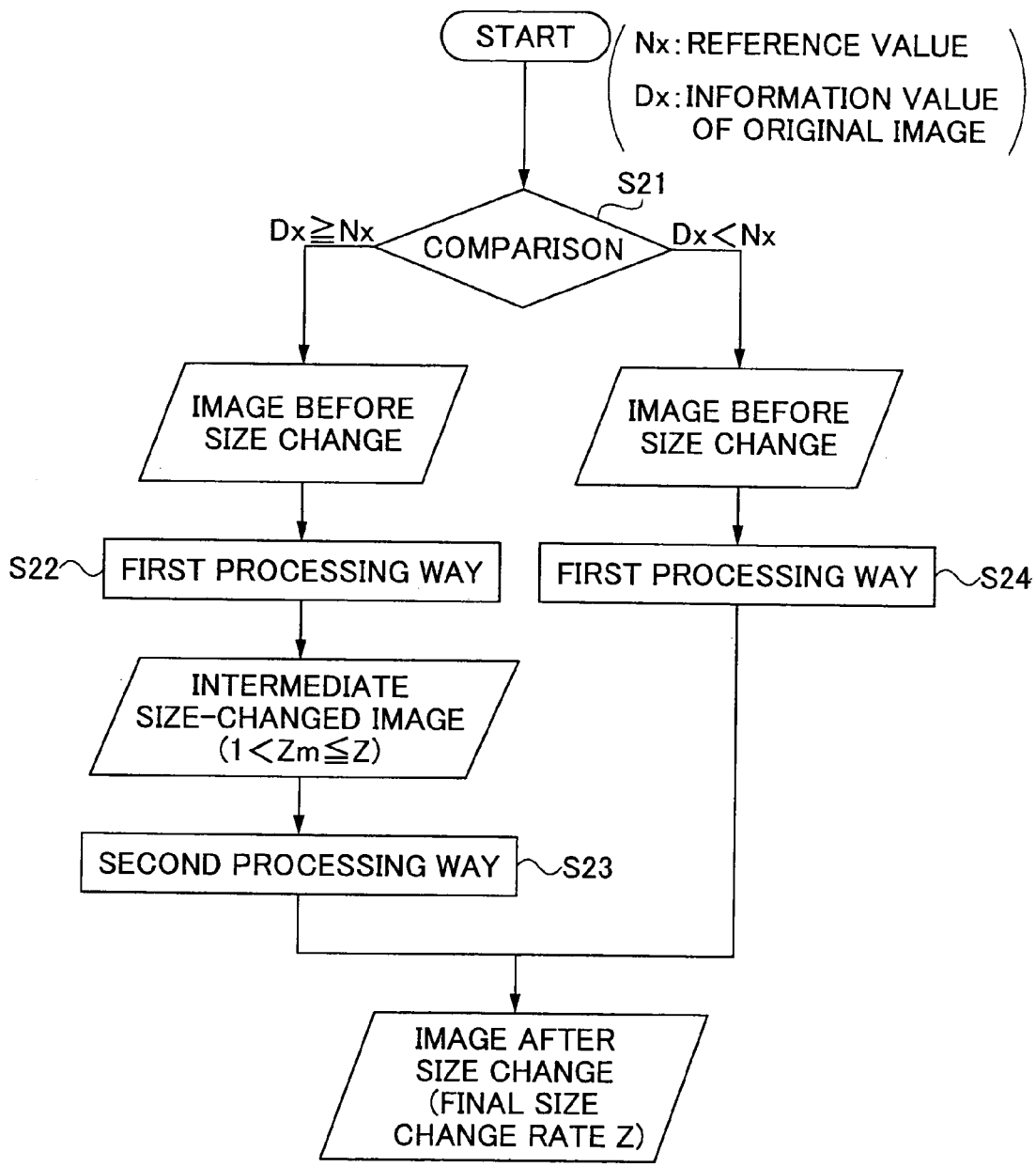
FIG. 7 shows an operation flow chart of an embodiment of an image processing method according to the present invention.

FIG. 7 shows a processing flow chart which shows a concept of each embodiment of the present invention.

Here, a case where two types of image size-change methods are prepared will be described.

In Step S21, a predetermined reference value N held in an image processing apparatus is referred to. This reference value N is a reference value previously determined for each type of information, such as a information/data amount of an original image, a size-change rate to be achieved, a number of available colors in the original image, or so, and the above-mentioned value N may be provided for each of the number of possible various different types of such information mentioned above. Furthermore, when controlling a size-change processing method finely, it is also possible to prepare a plurality of values N for each of these information types, and to appropriately use them in a manner of combination appropriately. Hereinafter, a case where one reference value N is set for each information type, and a reference value Nx of a certain information type thereof is applied.

For example, when an information value of the original image to be processed corresponding to the above-mentioned reference value Nx is Dx, in Step S21, a comparison is made on this Dx with the reference value Nx. Then, when Dx is below Nx, all the necessary image processing to a predetermined size-change rate Z is performed by a predetermined first processing way (Step S24).

On the other hand, when Dx exceeds Nx, it may be determined that if all the necessary processing were performed by the first processing way for the required size-change rate Z, the processing time thus taken would increase remarkably. Accordingly, in this case, the first processing way is applied only for a predetermined intermediate size-change rate Zm smaller than the finally required size-change rate Z (in Step S22).

As for the above-mentioned predetermined intermediate size-change rate Zm, it is preferable to determine it such that all the necessary processing including that in the above-mentioned predetermined first processing way and that in a predetermined second processing way can be completed within a predetermined time allowed.

Then, after the processing to the intermediate size-change rate Zm by the first processing way is executed, in Step S23, the remaining size-change processing for the finally required size-change rate Z is performed by the predetermined second processing way.

As will be described later, the above-mentioned predetermined first processing way is a way of image size-change processing especially configured to effectively reduce a degradation of image quality which would otherwise occur due to the size-change processing, and, for this purpose, including a certain calculation/operation processing which thus may require a relatively increased time to perform, or a relatively increased amount of data processing. In contrast thereto, the above-mentioned second processing is normally a simple image size-change processing such as a way of simply multiplying pixels in size magnification processing or a way of simply pixel thinning-out processing in size reduction, which normally includes no special processing required for effectively reducing a degradation of image quality which would otherwise occur due to the size-change processing, and, as a result, requires the minimum data processing time or minimum data processing amount.

Figure 8:
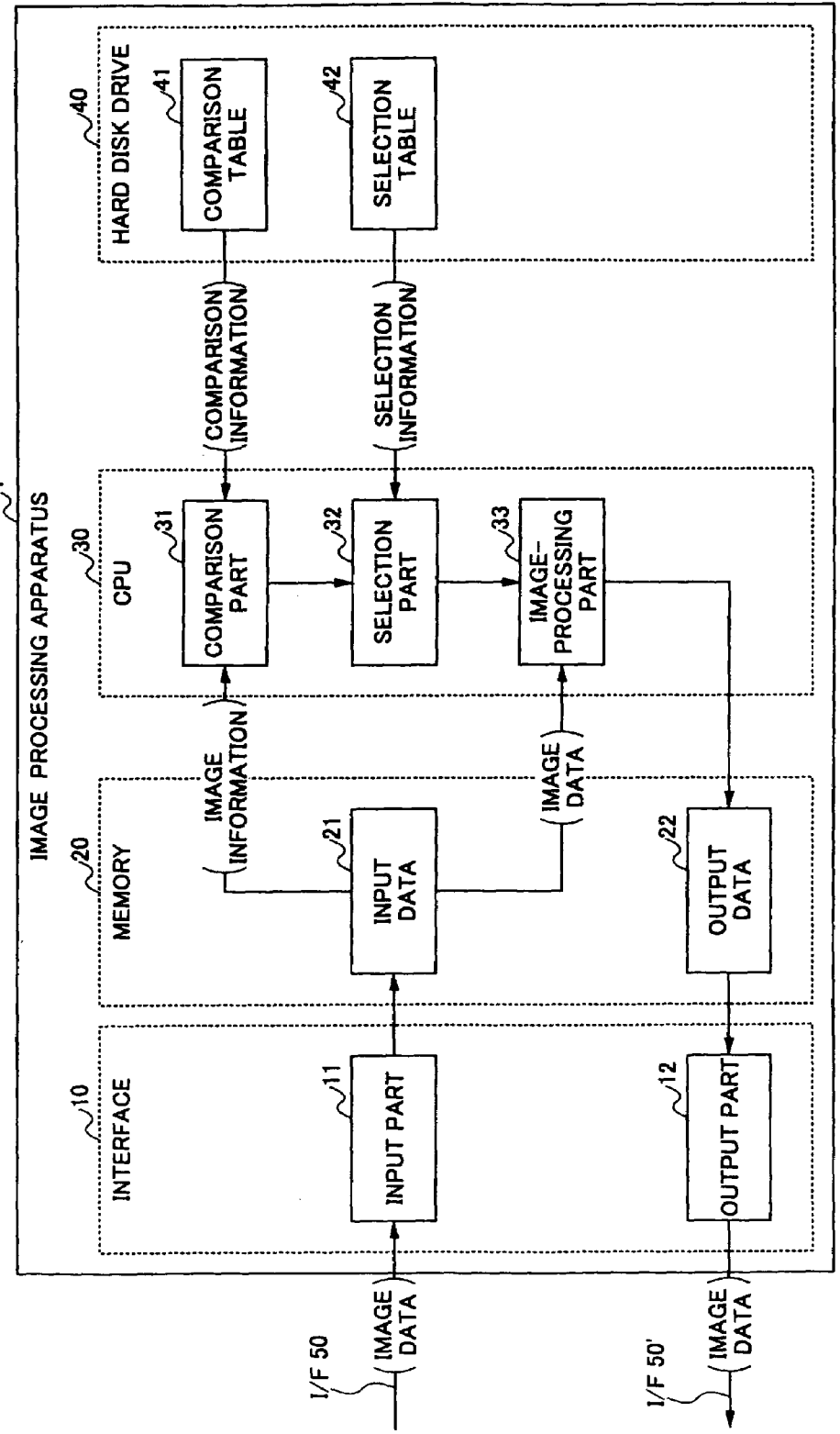
FIG. 8 shows a block diagram of an image processing apparatus according to the present invention.

FIG. 8 is a block diagram showing an example of configuration of an image processing apparatus applicable to each embodiment of the present invention, a basic scheme of which have been described above.

The image processing apparatus 1 includes an interface part 10 for exchanging signals with the exterior, a memory part 20 which stores temporarily data of the signal exchanged with the exterior through the interface part 10, a CPU part 30 which carries out actual image processing in this image processing apparatus, and a hard disk drive 40 which saves image data processed in the CPU part 30.

The above-mentioned interface part 10 includes an input part 11 which receives image data supplied from the outside, and an output part 12 which outputs image data having undergone processing in this image processing apparatus.

The above-mentioned memory part 20 includes an input data storing part 21 which stores image data input through the input part 11 of the interface part 10, and an output data part 22 storing image data temporarily having undergone processing by the CPU part before sending it out.

The above-mentioned CPU part 30 includes a CPU and a memory, performs various types of processing by executing programs loaded in the memory. The CPU part thus performs each function to act as an image processing comparison part 31, an image processing selection part 32, and an image processing part 33, which will be described. A processing operation of each part executed by the CPU part 30 is realized, for example, as a result of a respective software program being executed by the CPU.

Operations of this image processing apparatus will now be described. First, an original image is sent to the input part 11 of the interface processing part 10 through an I/F 50. The sent original image is held as an input original image in the memory 20 or so, and is set as a target of image processing. Next, the image processing comparison part 31 actually realized by the CPU part 30 as mentioned above obtains various types of image information from the input original image such as a data size, a rate of image size reduced, the number of colors used, etc., reads a threshold for each type of information from a comparison table 41 previously stored in the hard disk 40, performs a comparison of each type information read with the above-mentioned threshold, and sends a comparison result to the image processing selection part 32.

The image processing selection part 32 reads corresponding contents of image processing to be executed based on the sent comparison result from a selection table 42 stored in the hard disk etc., so as to determine processing to be executed, and sends the contents of processing as a determination result to the image processing part 33. The image processing part 33 processes the image data of the original image according to the sent contents of image processing. The processed result is output to an I/F 50' from the output part 12 of the interface processing part 10 after being held as an output original image in the memory 20.

That is, the image processing comparison part 31 performs comparison operation of Step S21 of FIG. 7, the image processing selection part 32 performs operation for choosing an intermediate size-change rate which shows a processing-way sharing ratio between the first processing way and the second processing way, based on the result of comparison by the above-mentioned comparison part 31, and the image processing part 33 performs image processing of respective Steps S22, S23, and S24.

In that case, the image processing comparison part 31 of the CPU part 30 compares the above-mentioned reference value Nx stored in the comparison table 41 beforehand saved in the hard disk part 40 with the corresponding information value Dx supplied from the input data part of the memory part 20, for example, the information amount of the relevant image data, and thus, performs the comparison operation of Step S21.

In the image processing selection part 32 of the CPU part 30, the intermediate size-change rate Zm for which a size-change processing in the first processing way is executed is chosen according to a matter as to how much the selection information stored in the selection table 42 of the hard disk part 40, for example, the information amount Dx of the corresponding image data exceeds the reference value Nx (Step S33), in a manner which will be described later.

Then, in the image processing part 33 of the CPU part 30, according to the comparison result from the image processing comparison part 31, and also, according to the selection result from the image processing selection part 32 in case of 'exceeding the reference value' occurring as the above-mentioned comparison result, the predetermined image processing is performed on the relevant image data, and, the image data thus processed is sent to the output data part 22 of the memory part 20 in which it is stored temporarily to be output externally after that.

Examples of system configuration in a case of applying the image processing apparatus according to the embodiment of the present invention to an actual computer system etc. will now be described. In such a case, three types of system configurations are considered and will be described with reference to FIGS. 9, 10 and 11.

Figure 9:
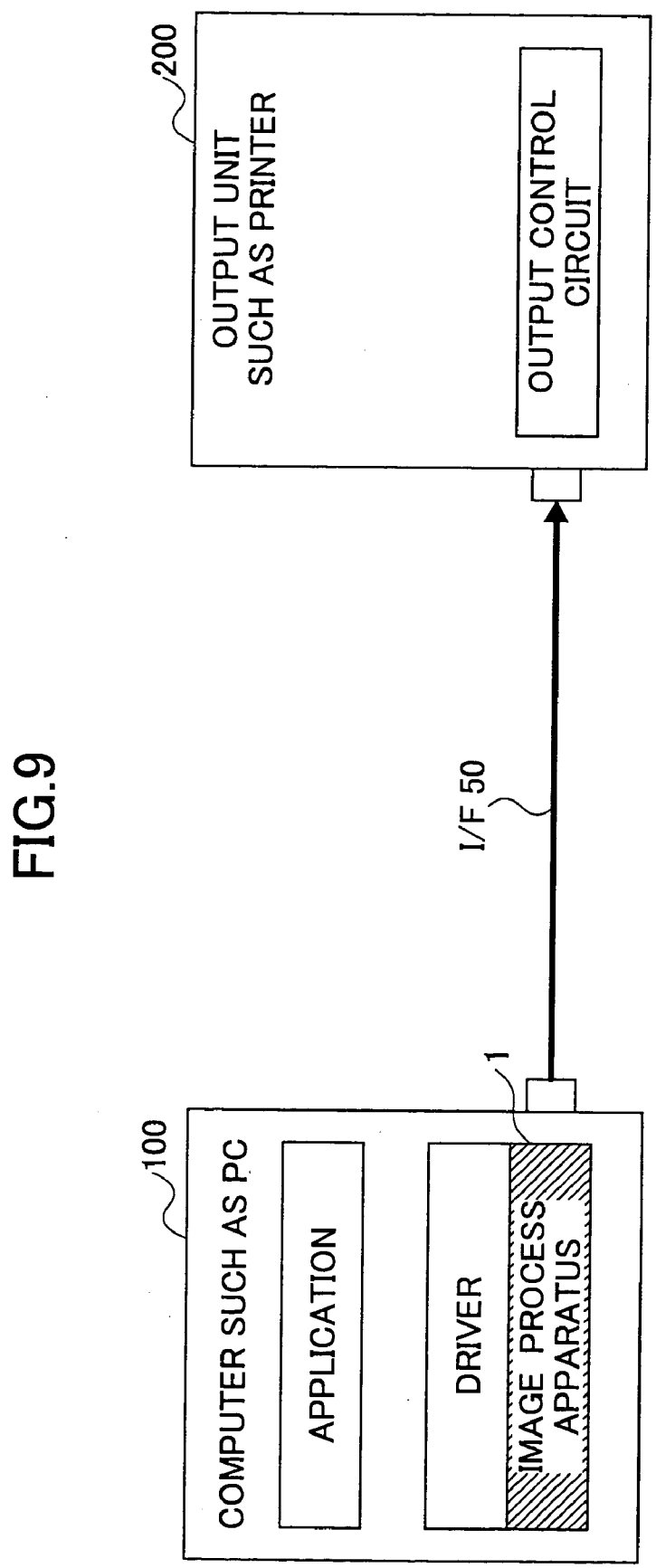
FIGS. 9, 10 and 11 show embodiments of various types of image processing systems according to the present invention.

FIG. 9 shows a case where the image processing apparatus according to the above-described embodiment of the present invention is included in a printer driver (program) which is installed in a personal computer 100 together with other applications. In this case, the image processing apparatus is of a program, in fact, and corresponds to a program which controls operation of the CPU in the CPU part 30 in the configuration shown in FIG. 8, and thus realizes the above-mentioned respective functions of the image processing comparison part 31, the image processing selection part 32, and the image processing part 33. In this case, the other portions of the image processing apparatus of FIG. 8 are realized by the respective functions which the personal computer or so 100 originally has, i.e., the interface function, the memory function, the CPU, the hard disk, etc.

The image data thus processed with the image processing apparatus in this case is transmitted to an output unit 200, such as a printer, and an output processing of printing out etc. is carried out there.

Figure 10:
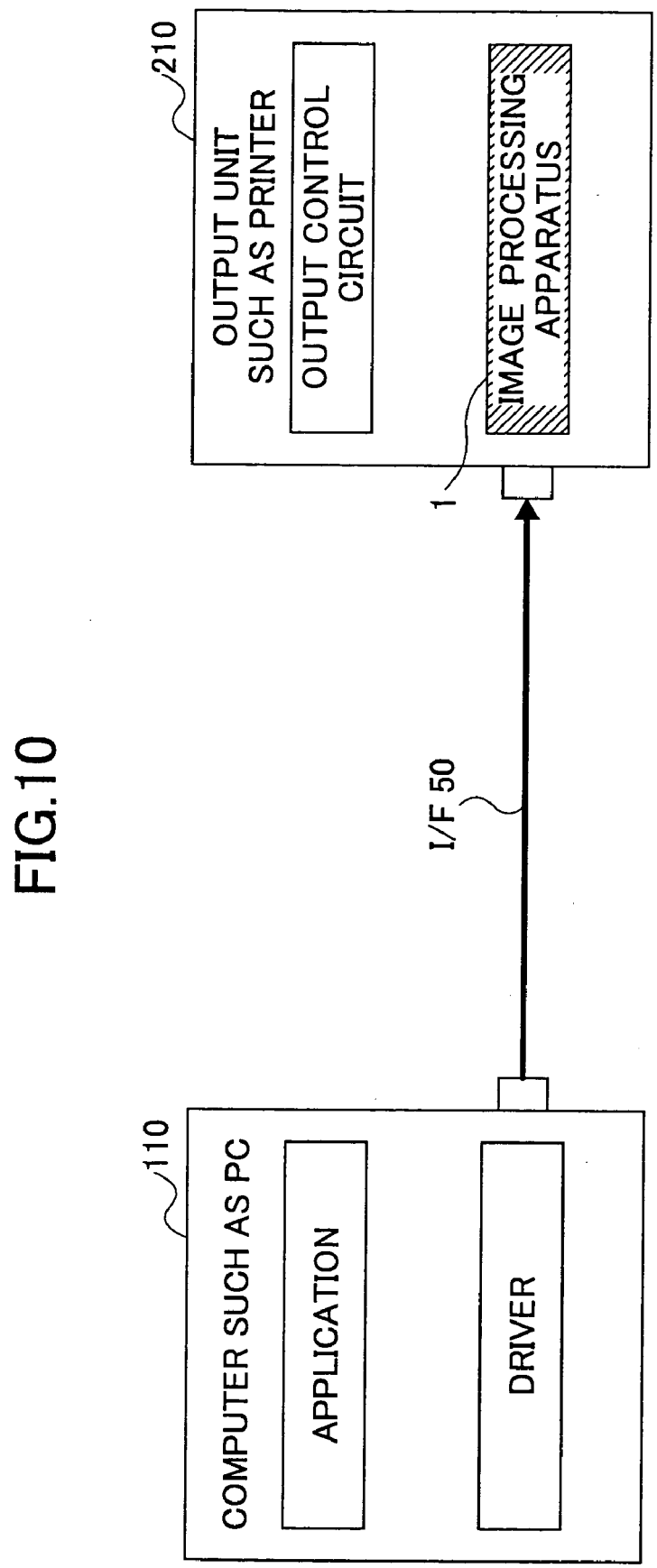

FIG. 10 shows a case where the image processing apparatus according to the embodiment of the present invention is realized as an image processing circuit mounted in an output unit, such as a printer, with other necessary output control circuits. In this case, the image processing apparatus is realized in fact by an LSI circuit which has a firmware. A program which controls operation of the CPU in the CPU part 30 in the configuration shown in FIG. 8 so as to realize the above-mentioned respective functions as the image processing comparison part 31, the image processing selection part 32, and the image processing part 33, respectively, is mounted as a firmware etc. in the LSI circuit. The functions of these respective parts are realized by controlling operation of the CPU included in the LSI circuit according to the firmware.

The other portions of the image processing apparatus of FIG. 8 are realized in this case by predetermined functional circuits also included in the LSI circuit. The configuration of the hard disk part 40 of FIG. 8 may be realized, not only by a hard disk drive unit but also by another memory device, for example, a semiconductor memory device etc.

Then, in this case, image data supplied from the computer 110 (FIG. 10) is processed with the image processing apparatus thus-included in the output unit 210, and an output processing of printing etc. is carried out under the control of an output control circuit or so also included there.

Figure 11:
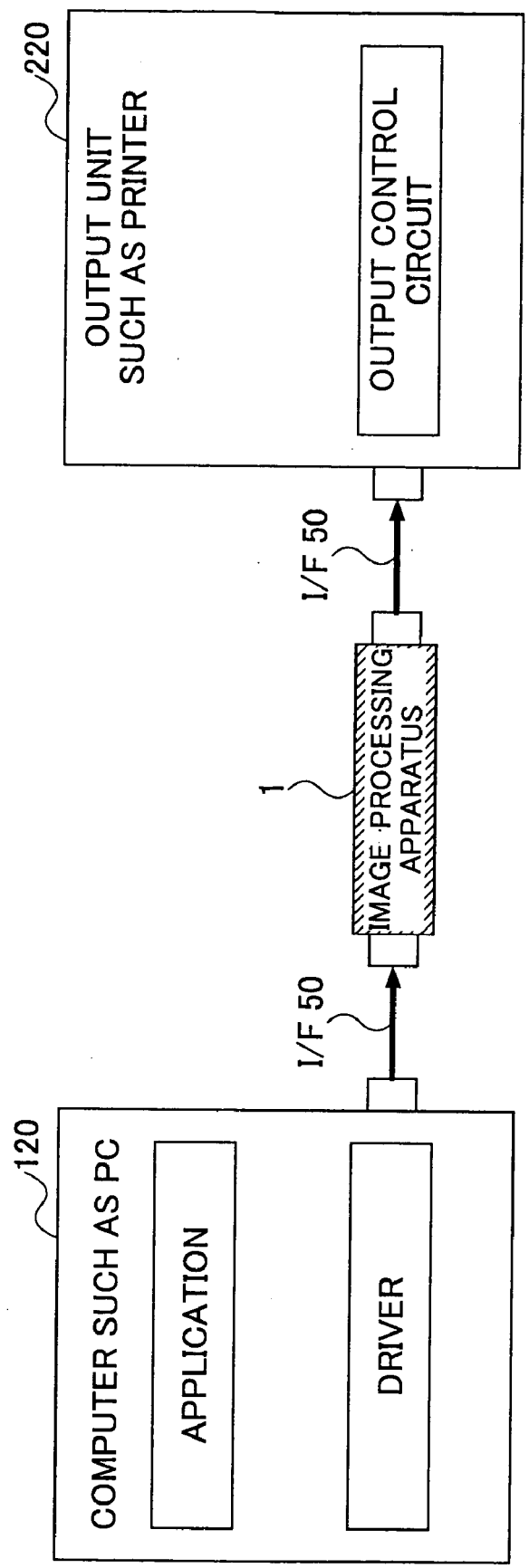

FIG. 11 shows another example in which the image processing apparatus according to the embodiment of the present invention is formed independently as an external apparatus. In this case, the image processing apparatus carries out operation described above with reference to FIG. 8, and realizes each processing concerned. Typically, the image processing apparatus in this case may be realized by a computer provided only for image processing in a form of a separate computer 120. Alternatively, in this case, the image processing apparatus 1 is provided independently on an I/F (interface) 50, and, thus, belongs to neither the computer 120 nor the printer 220, but the part which connects therebetween.

In any of the systems shown in FIG. 9, FIG. 10, and FIG. 11, the fundamental internal configuration of the image processing apparatus 1 which outputs image data of an original image after being processed by an application program which works on the computer, such as a personal computer, to an output unit, such as a printer, is common in general.

Below, respective specific embodiments of the present invention each having the above-mentioned basic configuration will now be described in detail. In each example, two types of processing ways, i.e., the first processing way and the second processing way are prepared for a magnification processing or a size-reduction processing. However, it is also possible that more than two types of processing ways are provided for each of a magnification processing and a size-reduction processing, and then, they may be appropriately combined in being applied for actual magnification/size-reduction processing.

The reference value N held in the comparison table 41 of image processing apparatus 1 shown in FIG. 8 is referred to in a comparison process in each embodiment. This reference value N may be a predetermined reference value determined for every image information provided for an original image, and may be provided in a several number of reference values N for respective types of image information. Moreover, in case of controlling a magnification processing or a size-reduction processing more finely, it is also possible to prepare a further plurality of sorts of reference values N for the above-mentioned every type of information. According to the respective embodiments of the present invention which will now be described, a single reference value N is applied for every information type, and a certain reference value Nx (for example, a data size, etc.) is applied for image information of an original image each time of predetermined image processing.

FIG. 12 shows a processing flow chart of an image processing apparatus 1 according to a first embodiment of the present invention. In Step S30, a user or an operator inputs to the image processing apparatus an instruction as to whether "magnification processing" or "(size-) reduction processing" should be performed on an original image. As a result, in case of magnification processing, the image processing apparatus 1 performs a procedure starting from Step S31.

That is, in Step S31, a comparison is made for an information amount Dx of a predetermined type of target image data, for example, the information amount of the target image data, with a corresponding reference value Nx (=NEx) previously held in the above-mentioned comparison table 41. Then, when the information amount of the image data which should be processed is smaller than the reference value Nx as a result (No of Step S31), an applying magnifying rate is set as ZZ which is a magnifying rate which is previously given by the operator (Step S37), and a magnification processing for the magnifying rate is carried out by the first processing way (see Japanese laid-open patent application No. 2001-188900 mentioned above) including the above-mentioned jaggy processing throughout the necessary processing (Step S38).

On the other hand, when the information amount of the image which should be processed exceeds the reference value as a result of the comparison of Step S31 (Yes), a predetermined intermediate magnifying rate Zm is set as a magnifying rate for which a magnification processing is performed first (Step S33), which intermediate magnifying rate Zm is a magnifying rate occurring intermediately in the course for the final magnifying rate of ZZ. Then, the above-mentioned first processing way is applied and thus a magnification processing is performed on the given image data so as to achieve the above-mentioned intermediate magnifying rate Zm (Steps S34 and S35).

Figure 1A:
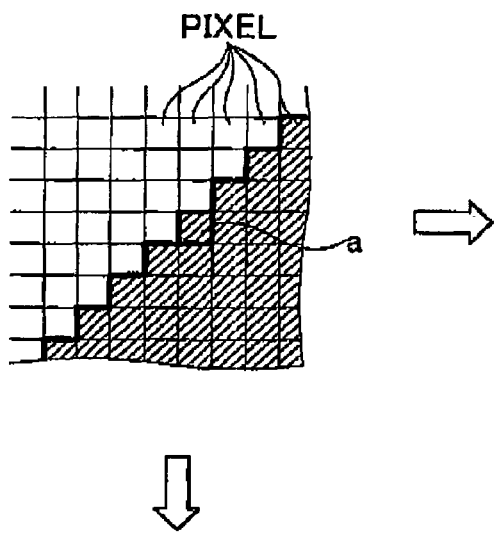
FIGS. 1A, 1B and 1C illustrate a difference in a resulting image depending on a way of processing applied in case of image size magnification processing.
Figure 1C:
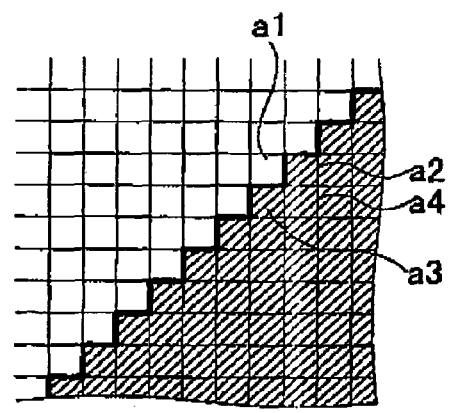

For example, in case of the target magnifying rate ZZ given is 8.4, the predetermined intermediate magnifying rate Zm is set as 8, for example. Then, up to the intermediate magnifying rate Zm, the magnification processing is processed so as to achieve the magnifying rate of 8 first by the first processing way. The first processing way which is a high-order image processing and thus, for example, includes the jaggy processing and thereby, a smooth contour of a relevant image is obtainable as shown in FIG. 1C, in comparison to a case of FIG. 1B which is obtained with a simple magnification processing and has a conspicuous jaggy phenomenon as mentioned above.

Figure 1B:
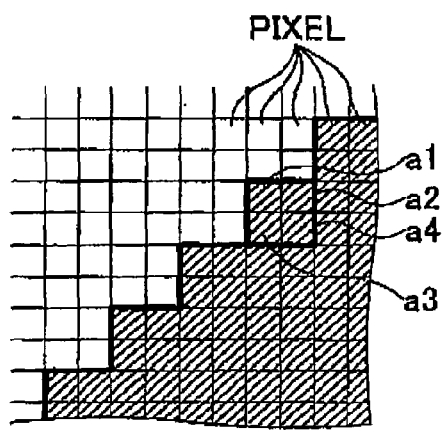
Figure 2:
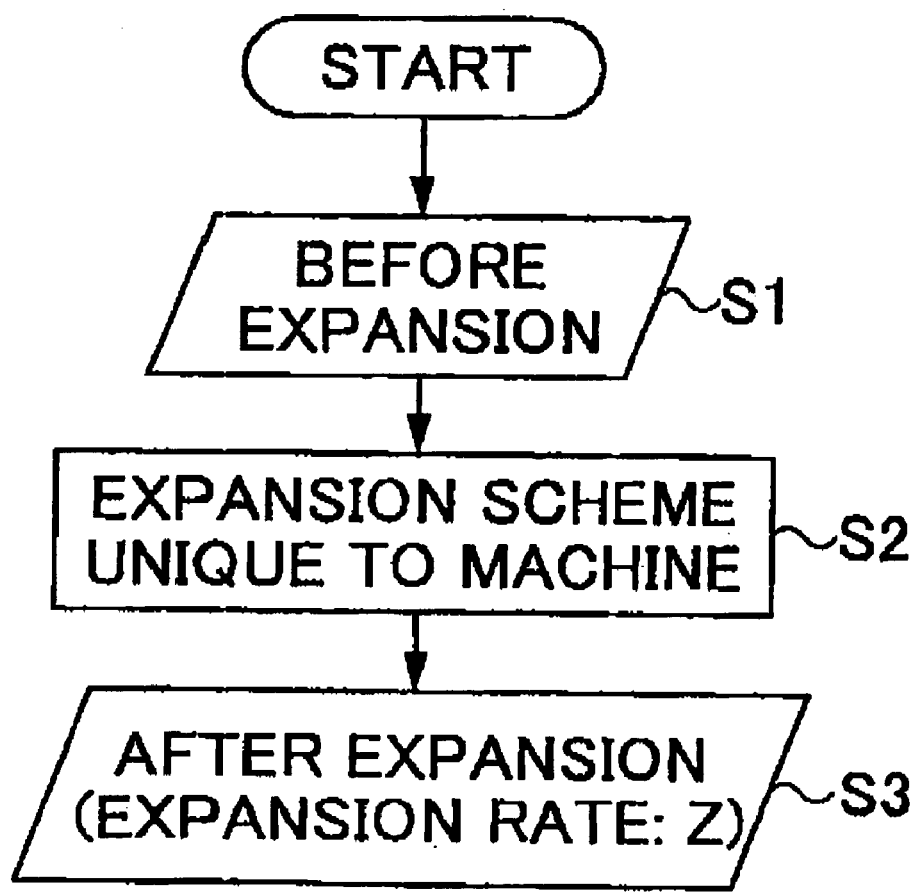
FIG. 2 shows an operation flow chart of an image processing method in a related art.
Figure 3:
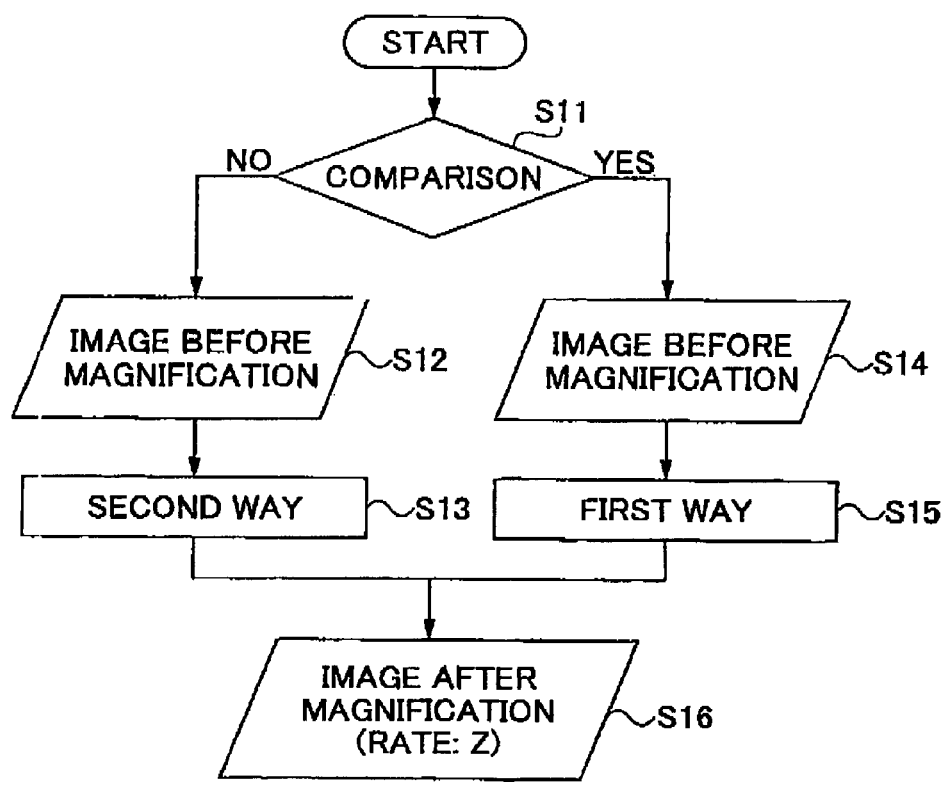
FIG. 3 shows an operation flow chart of another image processing method in a related art.
Figure 4A:
FIGS. 4A, 4B, 5A and 5B illustrate a problem occurring in image size reduction.
Figure 4B:
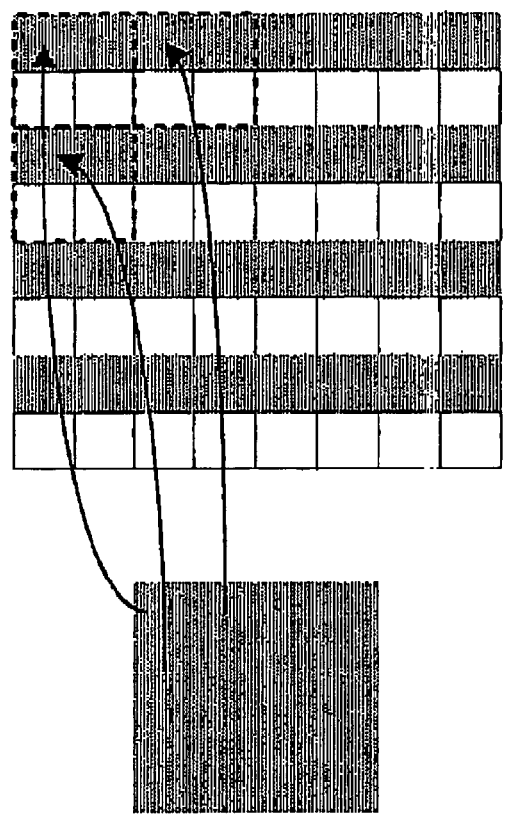
Figure 5A:
Figure 5B:
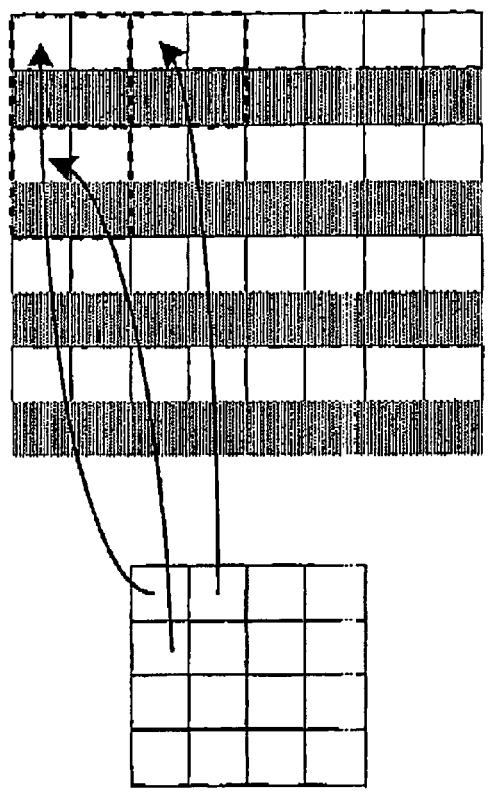

Then, for the image data obtained from undergoing the magnification processing for the 8-time magnified image in Steps S34 and S35, a further magnification processing for (8.4)/8 times is performed in Step S36. That is, (8.4)/8=1.05, and thus, the magnification processing achieving 1.05-time magnification is performed. Thereby, the final magnification rate of 8.4 times is obtained. In this case, a simple magnification processing such that, thereby a result as shown in above-mentioned FIG. 1B is obtained, is carried out for the remaining magnification for (8.4)/8.

Thus, according to the first embodiment of the present invention, the first advanced magnification processing with the jaggy processing is uniformly performed on given image data having the information amount below the reference value Nx. On the other hand, for given image data having the information amount exceeding this threshold, a magnification processing for the predetermined intermediate magnifying rate is carried out by the first advanced processing way (magnification processing including jaggy processing) for an intermediate magnifying rate, and then, the second processing way (simple magnification) simpler than the above-mentioned first processing way is applied for the remaining magnifying rate.

Generally, as the processing time required for executing image magnification processing in the first processing way (jaggy processing) is significantly larger then that in the second processing way (simple magnification) since the former requires a larger amount of operation to be processed, the processing in the first processing way may take a much time than in the second processing way. In this case, for example, two sets of input image data will now be discussed which have respective information amounts, a difference of which is very small, one of which exceeds the reference value Nx while the other does not exceeds the same.

In such a case of example, when the above-mentioned method described with reference to FIG. 12 is applied, for the larger set of the input image data, first, a magnification processing of partial 8 times is applied by the first processing way for example. Then, after that, the remaining magnification processing of (8.4)/8 times is performed. On the other hand, for the smaller set of input image, a magnification processing of total 8.4 times is applied by the first processing way. In this case, as the required time for the processing in the second processing way is very small as mentioned above with respect to that in the first processing way, the times required for processing the respective one sets of the input image data should be approximately the same.

Thus, according to the present invention, even when conditions of images to be processed are close to the above-mentioned reference value Nx which is the threshold, the processing times taken do not differ much from each other, and, also, the contents of the processing executed are approximately equal to each other. Accordingly, the images obtained from the processing do not have a much difference in image quality. Thus, the above-mentioned problem occurring in the related art can be solved.

On the other hand, when the required image processing is "size-reduction processing", a process starting from Step 131 is performed in FIG. 12. It is assumed that a required final (or target) size-reduction rate ZZ is input previously for the given original image. Then, in case an image information value of the original image to be compared with a reference value Nx is Dx, the image processing comparison part 31 compares the image information value Dx of the original image with the reference value Nx (which is NRx that may be different from the above-mentioned NEx in the case of the above-mentioned magnification processing) (S131). Then, when Dx is below Nx (No in Step S131), all the processing for the required size-reduction rate ZZ is performed by the first, relatively advanced processing way (S137).

On other hand, in case Dx exceeds Nx (Yes in Step S131), it is determined that, when all the processing were performed by the first processing way for the required final size-reduction rate ZZ, the necessary processing time would become longer than necessary. Then, in this case, once the processing is performed in the first processing way partially for an intermediate size-reduction rate Zm smaller than the final size-reduction rate ZZ. The above-mentioned intermediate size-reduction rate Zm is determined in Step S133 so that all the size-reduction processing for achieving the final required reduction rate including a first process for the intermediate rate Zmm by the first processing way and a remaining second process from the intermediate rate for the final size-reduction rate ZZ by the second processing way may be completed within a predetermined allowable time in this case. Then, in Step S134, for the intermediate size-reduction rate Zm, size-reduction processing by the first processing way is performed. After that, in order to attain the final size-reduction rate ZZ required, size-reduction processing for the remaining rate ZZ/Zm so as to achieve the final rate ZZ is performed in Step S135.

As mentioned above, also in the size-reduction processing starting from Step S131, image degradation can be effectively reduced, and size-reduction processing can be performed within a predetermined processing time, and the best quality of image can be obtained therein.

As the above-mentioned first (advanced or high-order) processing way, for example, a so-called three-dimensional spline method or so may be applied for a size-reduction processing which is a high-order image processing and achieves a image size-reduction with an effectively controlled image quality degradation. On the other hand, as the above-mentioned simple second processing way, the above-mentioned simple pixel thinning-out processing may be applied, for example.

In addition, in FIG. 12, since the contents of processing generally differ between the first processing way performed in Step S34 or S38 at a time of magnification and the first processing way performed in Step S134 or S138 at a time of size-reduction, the arts applied may differ therebetween accordingly. Namely, for example, as mentioned above, the first processing way at a time of magnification may be a processing way including the above-mentioned jaggy processing which is disclosed by Japanese laid-open patent application No. 2001-188900. On the other hand, the above-mentioned three-dimensional spline technology may be applied as the first processing way in the case of size-reduction processing, for example. On the other hand, the second processing way performed in Step S36 at a time of magnification and the second processing way performed in Step S136 at a time of size-reduction applied may be ones substantially common as will be described later.

Moreover, as shown in FIG. 12, when carrying out combining of the first processing way which includes relatively advanced image processing, such as jaggy processing, and the second processing way such as a simple multiplication or simple thinning-out, it is preferable that the relatively advanced way is first applied, and after that, the relatively simple processing way is applied. The reason therefor is as follows:

A case will now be discussed for the illustration purpose in which, first a size-change processing were performed in the simple second processing way, and, thus, data in the state shown in FIG. 1B or FIGS. 4B, 5B, or 6B would be obtained.

After that, a further size-change processing in the high-order first processing would be performed. In such a case, generally speaking, by the simple second processing way, an image degradation, in some case, a relatively serious one, may occur as mentioned above. Even the advanced first processing way would be applied after that, this once occurring degradation may not be corrected. Rather, when the high-grade processing way would be applied on the image having the degradation already occurring therein, the degradation would become more conspicuous. For example, a jaggy once occurring due to a first application of the second processing way may become clearer through an application of the high-grade processing way after that.

On the contrary, a case where after performing size change by the advanced first processing way previously, and the remaining size change is performed with an application of the simple second processing way will now be discussed. In this case, generally speaking, a first application of the first advanced processing may hardly cause a serious image degradation. Therefore, even the second simple processing way is applied after that on the same image for achieving the remaining size-change processing, an image degradation which may then occur in the second processing way may not cause a serious problem more than one which would inherently occur due to the application of the second processing way. In case of jaggy, when the second processing way is applied on an image after the image in the state shown in FIG. 1C is obtained from application of the high-order first processing way (jaggy corrected), a jaggy may then occur. However, the thus-occurring jaggy should be clearly a gentle one than that occurring in the above-mentioned contrary case in which the first processing way were applied after the image had the state of FIG. 1B. Thus, image degradation can be effectively reduced by first applying the high-order processing way.

Next, a specific way which can be applied as the above-mentioned second processing way of simple size reduction will now be described for example, with reference FIGS. 13A, 13B and 13C. FIG. 13A shows a state of pixels before magnification. The size thereof is expressed by the length SH and the width SW, as shown. FIG. 13B shows a state of the pixels after the magnification. In this state, the size is expressed by the length DH and the width DW. FIG. 13C shows a formula for calculating a value of each pixel after the magnification according to this simple pixel-multiplication magnification way. In this case, the magnifying rate applied is 1.5 times for example. Therefore, the number of pixels becomes 1.5 times for every direction, or the size is increased from 4 pixels to 6 pixels for each dimension as shown.

In the formula of total three lines of FIG. 13C, the first line is a formula for advancing the Y coordinate one by one, and the second line is a formula for advancing the X coordinate one by one. In the third line, a value of an arbitrary pixel D[Y][X] after the magnification is obtained, as shown, the reciprocal SH/DH of the vertical magnifying rate is multiplied on the value Y, similarly SW/DW is multiplied on X, and then, the thus-obtained values are rounded off, respectively. The value of the pixel located at the coordinates of the thus-obtained values originally is applied as a value of the relevant pixel after the magnification.

For example, in this case, the magnifying rate for each dimension is 1.5. Then, when the pixel hatched (D[2][3]) in FIG. 13B is discussed, $2/(1.5)=1.3 \rightarrow 1$ $3/(1.5)=2 \rightarrow 2$ Thus, as a result, '1' and '2' are obtained. Accordingly, the relevant pixel D[2][3] has the pixel value of the original pixel S[1][2].

The same technique can also be applied as the second processing way at a time of size reduction (Step S136). That is, for example, the above-mentioned formula is applied to a case where an original image of 8×8 is reduced in size into 4×4. In this case

SW=SH=8

DW=DH=4

Then the following calculation occurs:

```
for (Y=0, Y<4; Y++) {
    for (X=0, X<4; X++) {
        D[Y] [X] = S[8*Y/4] [8*X/4]
    }
}
```

Thus, the following results are brought:

D[0][0]=S[0][0]

D[1][0]=S[2][0]

D[2][0]=S[4][0]

D[3][0]=S[6][0]

D[0][1]=S[0][2]

D[1][1]=S[2][2]

D[2][1]=S[4][2]

D[3][1]=S[6][2]

D[0][2]=S[0][4]

D[1][2]=S[2][4]

D[2][2]=S[4][4]

D[3][2]=S[6][4]

D[0][3]=S[0][6]

D[1][3]=S[2][6]

D[2][3]=S[4][6]

D[3][3]=S[6][6]

Thus, the top-left pixel of every 2×2 pixel unit is selected from the original image, and thus, the same formula is also applicable for a case of size-reduction processing.

Next, a specific technique for obtaining the above-mentioned intermediate magnifying rate Zm in the first embodiment described above with reference to FIG. 12 will now be described.

The intermediate magnifying rate Zm (Step S32) or the intermediate size-reduction rate Zm (Step S132) can be obtained by a calculation. However, when a complete calculation were made for each case, a considerable time would be required. Accordingly, it is preferable to prepare a table which is obtained previously with a calculation made for each typical case, and, then, for each given particular image processing case, the above-mentioned table will be referred to appropriately. Such a reference table will be descried later.

In order to determine the intermediate magnifying rate Zm or the intermediate size-reduction rate Zm first, the following values are prepared beforehand.

First, a permissible processing time is set (referred to as Tt in the following calculation). That is, the magnification/size-reduction processing time which a user can permit is set previously. Then, after that, the intermediate magnifying/size-reduction rate Zm is determined in such a manner that the thus-set Tt is not exceeded by an actual total time required.

In determination of an actual one of the above-mentioned intermediate magnifying/reduction rate, a necessary processing time per unit data size Dsu is calculated first. This is a processing time required when data of a unit data size is processed (magnified or reduced in size) in the above-mentioned predetermined first processing way (advanced processing way) or in the second processing way (simple processing way) so as to achieve a predetermined size-change rate (magnifying rate or size-reduction rate). Also in this case, it is preferable that the calculation is previously performed for each of typical cases, the results are managed as a table, and after that, the data is utilized for each particular image processing case given.

Specifically, a magnification (size-reduction) processing time actually required per unit size in the first processing way is first defined as a one-dimensional array P1time[ ]. For example, in case of obtaining a processing time required for achieving a magnifying rate 4 or a size-reduction rate 4 (i.e., ¼ times, then, in any case of magnification or size reduction, the size-change rate is the same '4', and, thus, each thereof will be generally referred to as a 'size-change rate' '4', for example), a management is made as:

Processing time by first processing way=P1time [4].

The size-change processing time of the second processing way is similarly managed by a one dimensional array P2time[ ]. As the first processing way requires a more time as mentioned above, the following relation holds:

P1time [size-change rate]>P2time [size-change rate].

Assuming that a size of input data to be magnified is referred to as Ds, and a required (final) size-change rate is referred to as Zt, a total processing time required when the intermediate size-change rate Zm is set as mentioned above can be obtained from the following formulas (1):

$$Processing\ time = P1time[Zm] \times Ds/Dsu + P2time[Zt/Zm] \times Ds \times Zm \times Zm/Dsu \quad (1)$$

P1time[Zm]×Ds/Dsu in the first term indicates a required processing time taken in case where a size-change processing for the intermediate size-change rate Zm is performed by the first processing way on data of the size Ds.

P2time[Zt/Zm]×Ds×Zm×Zm/Dsu in the second term indicates a required processing time taken in case where, on the thus already size-changed data for the intermediate size-change rate Zm by the first processing way is then further size-changed by the second processing way for finally achieving the required final size-change rate Zt. In this case, since the remaining size-change rate amounts to Zt/Zm, the processing time per Dsu is P2time [Zt/Zm]. Further, since the size-change processing for the intermediate size-change rate Zm has been already made at this time, the size of the data to be further processed already has the size changed Zm times vertically and the size changed Zm times horizontally. Therefore, the data size of the data which then undergoes the second processing way is of Ds×Zm×Zm. For example, when the intermediate size-change rate Zm is "2", the data size of data to be processed in the second processing way has been already changed by 2×2=4 (times) with respect to the original data size.

Next, Zm is changed gradually if needed with comparing the processing time taken for each case with the above-mentioned processing time Tt, and thus, Zm at which the processing time taken agrees with the predetermined processing time Tt is obtained. Then, the thus-obtained Zm is regarded as "a final intermediate size-change rate Zm at a time of carrying out size-change processing of input data of a relevant data size for a predetermined final size-change rate" within the predetermined time Tt, and is managed in a table as mentioned above.

Figure 14:
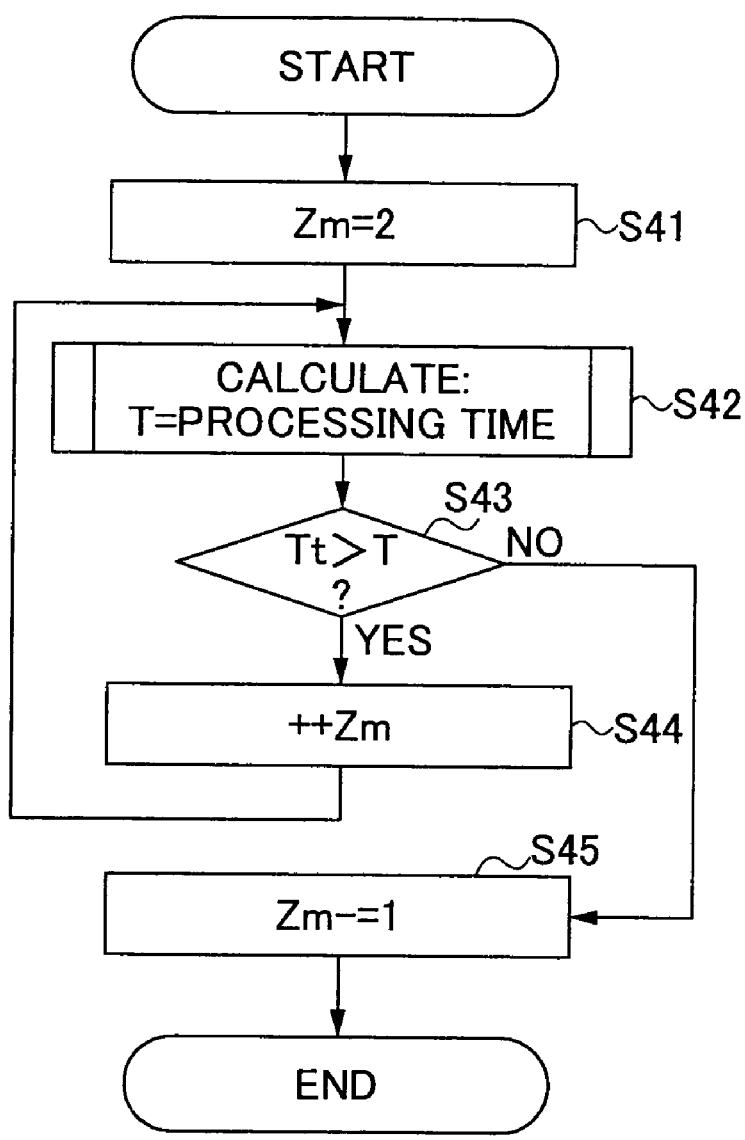
FIG. 14 shows an operation flow chart of a method of calculating an intermediate size-change rate applicable to some embodiments of the present invention.

A processing for determining such a final intermediate size-change rate Zm in example will now be described with reference to a flow chart shown in FIG. 14.

First, "2" is set as an initial value of Zm in Step S41. Next, In Step S42, a necessary processing time T in that case is calculated according to the above-mentioned formula (1). Then, the necessary processing time thus obtained in Step S43 is compared with the above-mentioned setting time Tt. As a result, when the necessary processing time T is shorter, "1" is added to Zm in Step S44. After that, the above processing is repeated until the processing time required T exceeds the setting time Tt.

Then, when the necessary processing time T exceeds the setting time Tt (No of Step S43), the current Zm is regarded as a final intermediate size-change rate in Step S45. However, actually, when T>Tt at this time, '1' is subtracted from the Zm, and the value thus obtained is regarded as a final intermediate size-change rate, actually.

Specific example will now be described for a processing of obtaining an intermediate size-change rate. First, Tt=800 [ms] is assumed as a target permissible processing time, and a unit data size is assumed as Dsu=10 [bytes]. Furthermore, the processing time required for each processing way per unit data size is previously obtained in a predetermined experimental manner, and the results are shown below.

| First processing way | Second processing way |
|---|---|
| P1time [1] = 10 [ms]; | P2time [1] = 1 [ms] |
| [2] = 20 [ms]; | [2] = 2 [ms] |
| [3] = 30 [ms]; | [3] = 3 [ms] |
| [4] = 40 [ms]; | [4] = 4 [ms] |
| [5] = 50 [ms]; | [5] = 5 [ms] |
| [6] = 60 [ms]; | [6] = 6 [ms] |
| [7] = 70 [ms]; | [7] = 7 [ms] |
| [8] = 80 [ms]; | [8] = 8 [ms] |
| [9] = 90 [ms]; | [9] = 9 [ms] |

Then, assuming that the size of input data to be size-changed is Ds=100 [bytes], and a desired size-change rate is Zt=9 [times]. Then, the intermediate size-change rate Zm is calculated as follows by the scheme described above with reference to FIG. 14.

That is, in case Zm=2 [times] in Step S41, $$T = P1time[Zm] \times Ds/Dsu + P2time[Zt/Zm] \times Ds \times Zm \times Zm/Dsu$$

$$= P1time[2] \times 100/10 + P2time[9/2] \times 100 \times 2 \times 2/10$$
$$= 200 + 160 = 360$$

in Step S42. In the above calculation, $$Zt/Zm = 9/2 = 4.5$$

is treated as '4' by taking only the integer.

In this case, since it 800>360, i.e., Tt>T, (Yes of Step S43), '1' is added to Zm in Step S44, and calculation is performed again in Zm=3.

Then, in the case of Zm=3 [times]:

$$T = P1time[3] \times 100/10 + P2time[9/3] \times 100 \times 3 \times 3/10$$
$$= 570$$

Since Tt>T also in this case, '1' is further added to Zm and it calculation is made further again in Zm=4.

Then, in the case of Zm=4 [times]:

$$T = P1time[4] \times 100/10 + P2time[9/4] \times 100 \times 4 \times 4/10$$
$$= 720$$

Since still Tt>T, '1' is further added to Zm and calculation is further performed again in Zm=5.

In the case of Zm=5 [times]:

$$T = P1time[5] \times 100/10 + P2time[9/5] \times 100 \times 5 \times 5/10$$
$$= 750$$

Since still Tt>T, '1' is further added to Zm and it calculation is further performed again in Zm=6.

In the case of Zm=6 [times]:

$$T = P1time[6] \times 100/10 + P2time[9/6] \times 100 \times 6 \times 6/10$$
$$= 960$$

Since finally Tt<T (No of Step S43), '1' is subtracted from the present Zm=6 in Step S45, and as a result, Zm is determined as Zm=5 in conclusion.

If such a calculation were performed each case a new data is input, a considerable time may be taken. In order to solve this problem, the following idea may be applied: That is, for example, it is preferable to perform such a calculation for a required processing time supposing various cases where the above-mentioned size Ds and the required size-change rate Zt are changed variously beforehand, and to manage the thus-obtained experimental results as a table at a time of first power supply is made in a relevant printer apparatus which applies therein the processing method according to the present invention. In such a case, in case of actually processing input data, this table is searched by using data of the size and required final size-change rate to be archived as key data for the search.

Thereby, it becomes possible to obtain immediately the intermediate size-change rate Zm corresponding to these input conditions.

This table may be created, for example, in a form of two-dimensional array such as Table[size][size-change rate]. In this case, when calculating for all of the available data sizes one by one finely, a considerable time may be taken, or a considerably huge capacity of memory may be required for storing the calculation results for the table. In order to solve this problem, an expected data size range is divided into some number of divisions, and, for each division of data sizes, the above-mentioned calculation is performed, and the intermediate size-change rate Zm may be obtained for each division of data size range. Namely, Table[1][size-change rate] is provided as a table value for obtaining the intermediate size-change rate Zm in case where the data size Ds is not more than S1; Table[2][size-change rate] is provided as a table value for obtaining the intermediate size-change rate Zm in case where the data size Ds is within a range between S1 and S2; Table[3][size-change rate] is provided as a table value for obtaining the intermediate size-change rate Zm in case where the data size Ds is within a range between S2 and S3; . . . ; Table[N][size-change rate] is provided as a table value for obtaining the intermediate size-change rate Zm in case where the data size Ds is more than SN. In this case, as to the size-change rate Zt, only an integer portion of the value of input desired size-change rate is regarded as the key for searching these table values.

In this case, when input data size is SS and desired size-change rate is 8.5 times, and SS is included in the range of S3 and S4, the relevant table value is obtained as the intermediate size-change rate Zm=Table[3][8].

The following shows a specific example of such a table for reference:

|  | | Input Data Size (bytes) | Desired Size Change Rate |
|---|---|---|---|
| Table | [1] [1]: | Ds < 100 | Zt < 2 |
|  | [1] [2]: | Ds < 100 | 2 ≦ Zt < 3 |
|  | [1] [3]: | Ds < 100 | 3 ≦ Zt < 4 |
|  | [1] [4]: | Ds < 100 | 4 ≦ Zt < 5 |
|  | [1] [5]: | Ds < 100 | 5 ≦ Zt < 6 |
|  | [1] [6]: | Ds < 100 | 6 ≦ Zt < 7 |
|  | [1] [7]: | Ds < 100 | 7 ≦ Zt < 8 |
|  | [1] [8]: | Ds < 100 | 8 ≦ Zt < 9 |
|  | [1] [9]: | Ds < 100 | 9 ≦ Zt |
| Table | [2] [1]: | 100 ≦ Ds < 200 | Zt < 2 |
|  | [2] [2]: | 100 ≦ Ds < 200 | 2 ≦ Zt < 3 |
|  | [2] [3]: | 100 ≦ Ds < 200 | 3 ≦ Zt < 4 |
|  | [2] [4]: | 100 ≦ Ds < 200 | 4 ≦ Zt < 5 |
|  | [2] [5]: | 100 ≦ Ds < 200 | 5 ≦ Zt < 6 |
|  | [2] [6]: | 100 ≦ Ds < 200 | 6 ≦ Zt < 7 |
|  | [2] [7]: | 100 ≦ Ds < 200 | 7 ≦ Zt < 8 |
|  | [2] [8]: | 100 ≦ Ds < 200 | 8 ≦ Zt < 9 |
|  | [2] [9]: | 100 ≦ Ds < 200 | 9 ≦ Zt |
| Table | [3] [1]: | 200 ≦ Ds < 300 | Zt < 2 |
|  | [3] [2]: | 200 ≦ Ds < 300 | 2 ≦ Zt < 3 |
|  | [3] [3]: | 200 ≦ Ds < 300 | 3 ≦ Zt < 4 |
|  | [3] [4]: | 200 ≦ Ds < 300 | 4 ≦ Zt < 5 |
|  | [3] [5]: | 200 ≦ Ds < 300 | 5 ≦ Zt < 6 |
|  | [3] [6]: | 200 ≦ Ds < 300 | 6 ≦ Zt < 7 |
|  | [3] [7]: | 200 ≦ Ds < 300 | 7 ≦ Zt < 8 |
|  | [3] [8]: | 200 ≦ Ds < 300 | 8 ≦ Zt < 9 |
|  | [3] [9]: | 200 ≦ Ds < 300 | 9 ≦ Zt |
| Table | [4] [1]: | 300 ≦ Ds < 400 | Zt < 2 |
|  | [4] [2]: | 300 ≦ Ds < 400 | 2 ≦ Zt < 3 |
|  | [4] [3]: | 300 ≦ Ds < 400 | 3 ≦ Zt < 4 |
|  | [4] [4]: | 300 ≦ Ds < 400 | 4 ≦ Zt < 5 |
|  | [4] [5]: | 300 ≦ Ds < 400 | 5 ≦ Zt < 6 |
|  | [4] [6]: | 300 ≦ Ds < 400 | 6 ≦ Zt < 7 |

-continued

| | Input Data Size (bytes) | Desired Size Change Rate |
|---|---|---|
| | [4] [7]: $300 \leq Ds < 400$ | $7 \leq Zt < 8$ |
| | [4] [8]: $300 \leq Ds < 400$ | $8 \leq Zt < 9$ |
| | [4] [9]: $300 \leq Ds < 400$ | $9 \leq Zt$ |
| Table | [5] [1]: $400 \leq Ds < 500$ | $Zt < 2$ |
| | [5] [2]: $400 \leq Ds < 500$ | $2 \leq Zt < 3$ |
| | [5] [3]: $400 \leq Ds < 500$ | $3 \leq Zt < 4$ |
| | [5] [4]: $400 \leq Ds < 500$ | $4 \leq Zt < 5$ |
| | [5] [5]: $400 \leq Ds < 500$ | $5 \leq Zt < 6$ |
| | [5] [6]: $400 \leq Ds < 500$ | $6 \leq Zt < 7$ |
| | [5] [7]: $400 \leq Ds < 500$ | $7 \leq Zt < 8$ |
| | [5] [8]: $400 \leq Ds < 500$ | $8 \leq Zt < 9$ |
| | [5] [9]: $400 \leq Ds < 500$ | $9 \leq Zt$ |
| Table | [6] [1]: $500 \leq Ds < 600$ | $Zt < 2$ |
| | [6] [2]: $500 \leq Ds < 600$ | $2 \leq Zt < 3$ |
| | [6] [3]: $500 \leq Ds < 600$ | $3 \leq Zt < 4$ |
| | [6] [4]: $500 \leq Ds < 600$ | $4 \leq Zt < 5$ |
| | [6] [5]: $500 \leq Ds < 600$ | $5 \leq Zt < 6$ |
| | [6] [6]: $500 \leq Ds < 600$ | $6 \leq Zt < 7$ |
| | [6] [7]: $500 \leq Ds < 600$ | $7 \leq Zt < 8$ |
| | [6] [8]: $500 \leq Ds < 600$ | $8 \leq Zt < 9$ |
| | [6] [9]: $500 \leq Ds < 600$ | $9 \leq Zt$ |
| Table | [7] [1]: $600 \leq Ds < 700$ | $Zt < 2$ |
| | [7] [2]: $600 \leq Ds < 700$ | $2 \leq Zt < 3$ |
| | [7] [3]: $600 \leq Ds < 700$ | $3 \leq Zt < 4$ |
| | [7] [4]: $600 \leq Ds < 700$ | $4 \leq Zt < 5$ |
| | [7] [5]: $600 \leq Ds < 700$ | $5 \leq Zt < 6$ |
| | [7] [6]: $600 \leq Ds < 700$ | $6 \leq Zt < 7$ |
| | [7] [7]: $600 \leq Ds < 700$ | $7 \leq Zt < 8$ |
| | [7] [8]: $600 \leq Ds < 700$ | $8 \leq Zt < 9$ |
| | [7] [9]: $600 \leq Ds < 700$ | $9 \leq Zt$ |
| Table | [8] [1]: $700 \leq Ds < 800$ | $Zt < 2$ |
| | [8] [2]: $700 \leq Ds < 800$ | $2 \leq Zt < 3$ |
| | [8] [3]: $700 \leq Ds < 800$ | $3 \leq Zt < 4$ |
| | [8] [4]: $700 \leq Ds < 800$ | $4 \leq Zt < 5$ |
| | [8] [5]: $700 \leq Ds < 800$ | $5 \leq Zt < 6$ |
| | [8] [6]: $700 \leq Ds < 800$ | $6 \leq Zt < 7$ |
| | [8] [7]: $700 \leq Ds < 800$ | $7 \leq Zt < 8$ |
| | [8] [8]: $700 \leq Ds < 800$ | $8 \leq Zt < 9$ |
| | [8] [9]: $700 \leq Ds < 800$ | $9 \leq Zt$ |
| Table | [9] [1]: $800 \leq Ds$ | $Zt < 2$ |
| | [9] [2]: $800 \leq Ds$ | $2 \leq Zt < 3$ |
| | [9] [3]: $800 \leq Ds$ | $3 \leq Zt < 4$ |
| | [9] [4]: $800 \leq Ds$ | $4 \leq Zt < 5$ |
| | [9] [5]: $800 \leq Ds$ | $5 \leq Zt < 6$ |
| | [9] [6]: $800 \leq Ds$ | $6 \leq Zt < 7$ |
| | [9] [7]: $800 \leq Ds$ | $7 \leq Zt < 8$ |
| | [9] [8]: $800 \leq DS$ | $8 \leq Zt < 9$ |
| | [9] [9]: $800 \leq Ds$ | $9 \leq Zt$ |

Thus, the table is expressed in a form of two-dimensional array as mentioned above, the intermediate size-change rate Zm is calculated in the respective conditions for each table value according to the scheme described above with reference to FIG. 14, and, the thus-obtained value is stored as the relevant table value.

For example, the above-mentioned calculation example (Ds=100; Zt=9) corresponds a case where the data size Ds is in a range between 100 and 200 bytes, and the required size-change rate is not less than 9 times. Accordingly, the intermediate size-change rate Zm=5 which is the above-mentioned calculation result is thus stored in the table value of the relevant Table[2][9].

Generally speaking, the processing contents are different between a magnification processing and a size-reduction processing even both of them are included generally in the common concept of size-change processing, especially for the above-mentioned first processing way (advanced, high-order way). Accordingly, generally, the required processing time differs therebetween for each processing condition (data size of original image and desired size-change rate). Accordingly, the above-mentioned table data with different contents may be prepared separately for magnification processing (Step S33 of FIG. 12) and for size-reduction processing (Step S133).

As mentioned above, the present invention can be applied to both cases of 'magnification processing' and 'size-reduction processing' basically in the same manner. In case of application to a case of size-reduction processing, for the above-mentioned first processing way which is a high-order processing by which image degradation can be effectively avoided, but which requires a relatively longer processing time, and the above-mentioned second processing way which is a simple processing which requires a less processing time but by which an image degradation may occur to a relatively serous extent, may be, for example, a well-known 'bi-cubic method' (first processing way) and a well-known 'nearest neighbor method' (second processing way) may be applied, respectively. Details of these methods are disclosed, for example, in 'Consideration on Image Enlargement Methods' written by Takashi KAWASAKI, pages 9-11, distributed in the 45-th monthly rollout of Intellectual System Design Laboratory, as different ways of a resampling scheme.

Figure 15:
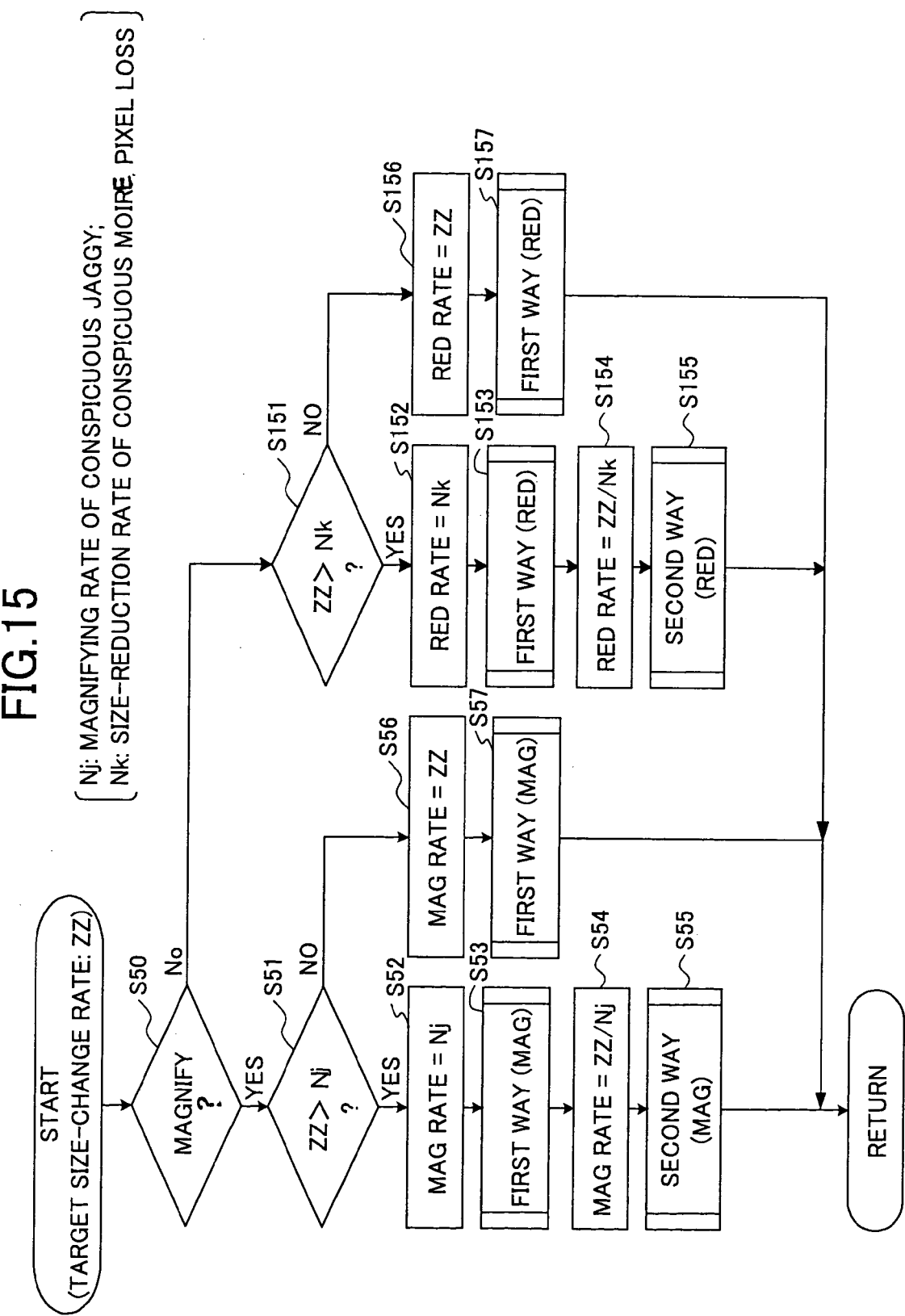
FIG. 15 shows an operation flow chart of a second embodiment of an image processing method according to the present invention.

Next, a configuration of a second embodiment of the present invention will now be described with reference to FIG. 15. In the case of the second embodiment, for magnification processing, such a magnifying rate Nj is previously set that, a jaggy phenomenon is likely to become conspicuous when the entire process of a magnification processing for this magnifying rate is performed by the above-mentioned second processing way. On the other hand, for size-reduction processing, such a size-reduction rate Nk is previously set that, an image degradation is likely to become conspicuous due to a Moiré phenomenon or pixel loss phenomenon when the entire process of a size-reduction processing for this size-reduction rate is performed by the above-mentioned second processing way.

Generally, in an image obtained after image processing such as a magnification processing or a size-reduction processing, a jaggy mentioned above at a time of magnification, or an image degradation resulting from a well-known Moiré phenomenon or pixel loss at a time of size reduction tends to be more conspicuous according to the simple second processing way, as the rate of image size change, i.e., magnifying rate or size-reduction late becomes larger. In this embodiment, when a required image size-change rate exceeds the above-mentioned predetermined reference value Nj or Nk, the size-change processing is performed for the size-change rate of this reference value by the high-order first processing way, and, then, the simple second processing way is applied for the remaining size-change rate.

Specifically, after selecting as to whether magnification or size reduction is performed is made in Step S50, when a given target size-change rate ZZ is smaller than the above-mentioned predetermined reference value Nj or Nk (No of Step S51, or No of Step S151), the relevant size-change processing is carried out by the first processing way uniformly for the final target size-change rate ZZ (Steps S56 and S57 or Steps S156 and S157).

On the other hand, otherwise (Yes of Step S51, or Yes of Step S151), namely, when the given target size-change rate ZZ is larger than the reference magnifying rate Nj in which the above-mentioned jaggy would become conspicuous, or when it larger than the reference size-reduction rate Nk in which Moiré etc. would become conspicuous (in other words, when the size is reduced to a much smaller one), the magnification processing or size-reduction processing is performed by the first processing way for the size-change processing to achieve the reference rate Nj of Nk for which jaggy or Moiré would become conspicuous if the second processing way were applied there (Steps S52 and S53 or Steps S152 and S153). Then, after that, the remaining partial size-change rate (partial magnifying rate of ZZ/Nj) or (partial size-reduction rate of ZZ/Nk), the second processing way is applied so that consequently the size-change processing for the target final size-change rate ZZ is achieved (Steps S54 and S55, Steps S154 and S155). In fact, Nj×ZZ/Nj=ZZ, or Nk×ZZ/Nk=ZZ.

Thus, according to the second embodiment described above, the first processing way (high-order processing) is applied throughout of a magnification processing for a magnifying rate in which a jaggy would become conspicuous, or throughout of a size-reduction processing for a size-reduction rate in which a Moiré or so would become conspicuous. As a result, even a given target magnifying rate or given target size-reduction rate is large, an occurrence of image degradation due to jaggy or Moiré or so can be effectively avoided. Further, the simple second processing is applied for the remaining size-change rate (ZZ/Nj or ZZ/Nk) in which jaggy or Moiré has thus become not conspicuous as a result of the first application of the first processing way in a previous step. Accordingly, the required processing time can be effectively reduced.

Next, a configuration of a third embodiment of the present invention will be described with reference to FIG. 16.

Figure 16:
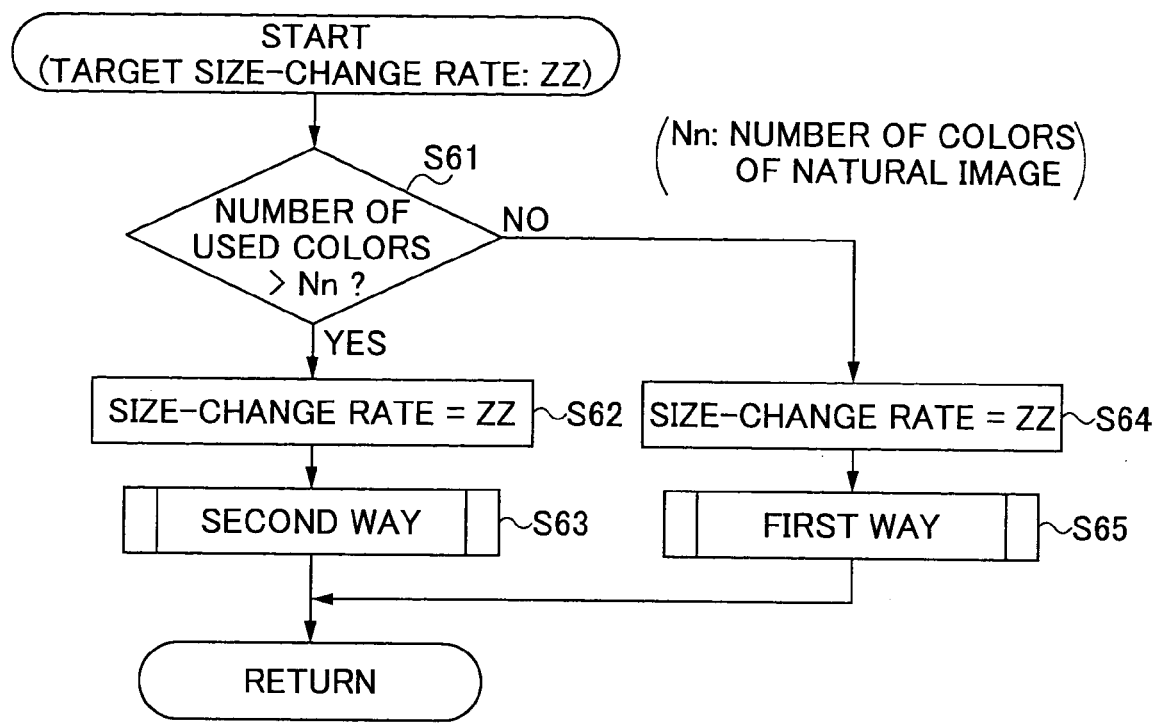
FIG. 16 shows an operation flow chart of a third embodiment of an image processing method according to the present invention.

"Number of used colors by which it can be determined as a natural image", Nn, is set as shown in FIG. 16. When the number of colors used (which is the number of available colors for every pixel, for example, 256 colors, the number of colors which can be expressed by 16 bits or 24 bits, or so) in an original image to be processed is smaller than this reference value Nn (No of Step S61), the first processing way of high-order processing is applied throughout of the required size-change processing for the target size-change rate ZZ (Steps S64 and S65). On the other hand, when the number of colors currently used in the original image is equal to or more than the reference value Nn (Yes of Step S61), the simple second processing (not including a high-order processing such as jaggy process) throughout of the required size-change processing for the target size-change rate (Steps S62 and S63).

Generally speaking, a type of an image in which jaggy or Moiré tends to become conspicuous after undergoing size-change processing is, in many cases, an image having a small number of colors used there such as a character image (text document or so), a graphic image, or so. On the other hand, in case where an image has a large number of colors used there such as a natural image such as a photographic image taken via a digital camera or so, in many case, jaggy or Moiré may not become conspicuous even after a size-change processing is performed on such an image. Accordingly, in such a case of handling an image having a large number of colors used there such as a photographic image, a magnifying method should not necessarily employ a high-order processing way such as jaggy processing, or a size-reduction method should not necessarily employ a high-order processing way especially deigned for avoiding occurrence of Moiré or so, even for maintaining the image quality. In other words, even such a high-order processing way is applied for handling such an image as of natural image or photographic image, an expected effect may not be obtained. Rather, as the processing time required increases accordingly, it may not be preferable for a user.

The third embodiment has been devised in view of such a condition. When the number of used colors of an original image is larger than Nn (Yes of Step S61), it is determined that the image is a natural image or so, and, thus, not the first processing way of high-order processing but the second processing way of simple processing is applied throughout of the desired size-change processing for the target size-change rate. Thereby, the required processing time can be effectively reduced.

Figure 17:
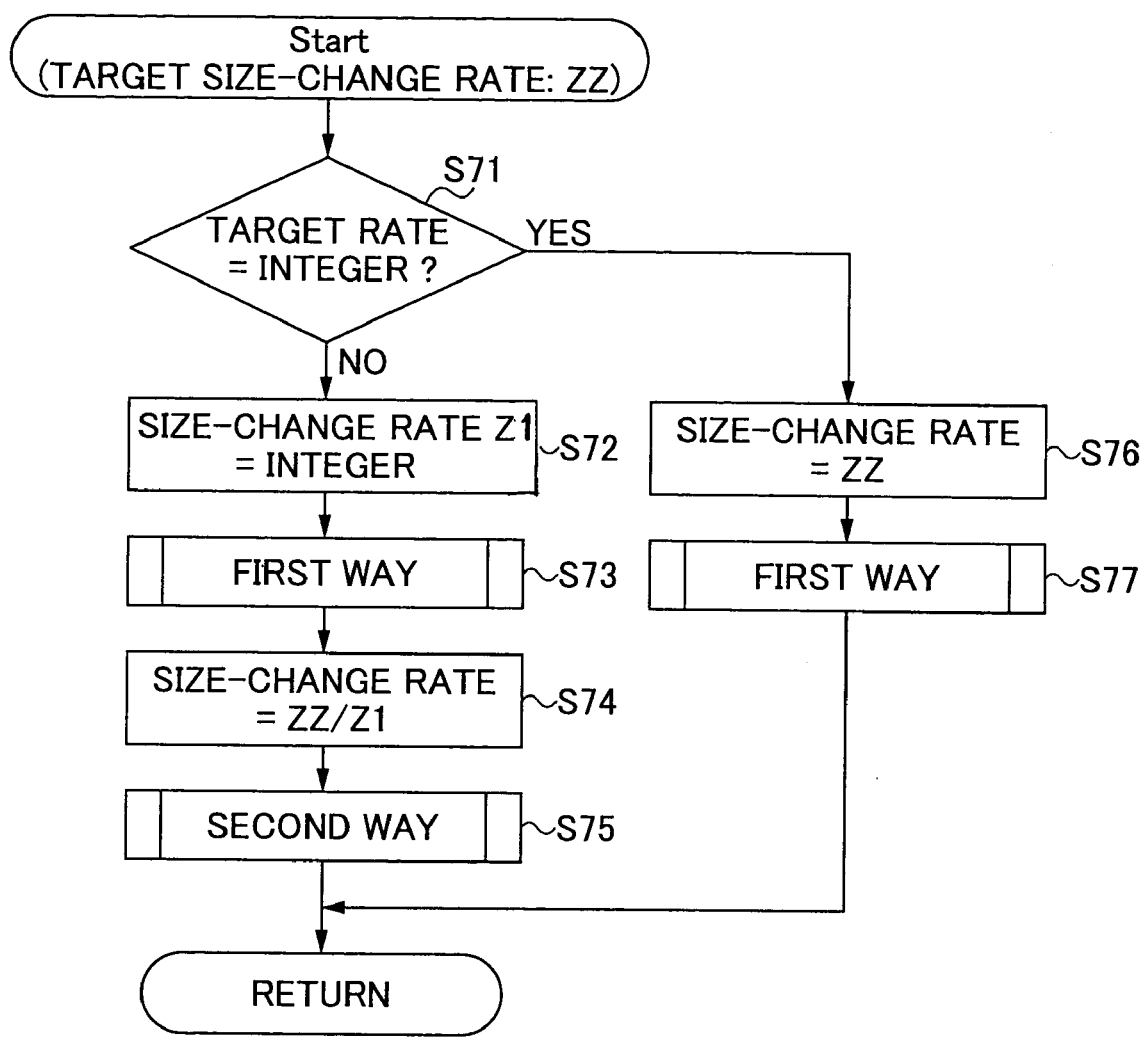
FIG. 17 shows an operation flow chart of a fourth embodiment of an image processing method according to the present invention.

Next, a configuration of a fourth embodiment of the present invention will now be described with reference to FIG. 17. When transmitting image data to a printer etc. from a personal computer etc. and carrying out a printing out of an image therewith, in order to compensate a difference in resolution between the original image data and the performance of the printer etc., generally, a size-change processing such as a magnification processing, size-reduction processing, or so, is performed in many cases if necessary. In this case, generally, the required magnifying rate or size-reduction rate does not fall in an integer, but includes a fraction in many cases.

In such a case, the size-change processing for the required size-change rate should be performed includes a size-change rate of an integer and also another size change rate of a fraction. Such a size-change processing for a fraction size-change rate may cause an increase in the required processing time in general since the required operation/calculation becomes complicated accordingly. This tendency generally becomes remarkable especially in case of applying the above-mentioned first processing way which is high-order processing including a jaggy processing or a processing specially deigned for avoiding an occurrence of Moiré or pixel loss, in comparison to a case of applying the above-mentioned simple second processing way.

Then, according to the fourth embodiment, when a given target size-change rate ZZ is of an integer value without any fraction (Yes of Step S71), the first processing way which includes an advanced image processing, such as jaggy processing or so, is applied throughout the required size-change processing (Steps S76 and S77). On the other hand, in case the given target size-change rate includes a fraction (for example, it is '8.4' or so rather than simple '8' which is an integer) (No of Step S71), magnification or size reduction for the integer size-change portion Z1 ('8' in the above-mentioned example) is performed in the first processing way (Steps S72 and S73). Then, after that, for the remaining fraction size-change portion (ZZ/Z1, i.e., (8.4)/8=1.05, in the above-mentioned example), the second processing way which is a simple size-change processing is applied (Steps S74 and S75). That is, in the above-mentioned example, the size-change processing for the portion of 8.4/8=1.05 (times) is performed by the second processing way.

Thus, according to the present invention, the simple second processing way is applied for the fraction portion which otherwise would require a considerable processing time. Thereby, it becomes possible to effectively reduce the total required time. Further, the first processing way which includes a high-order processing such as a jaggy processing should be applied only for the size-change processing for the integer size-change portion. Accordingly, the algorism which should be applied for this operation/calculation can be effectively simplified, which would be complicated when the first processing way is applied also for the fraction size-change portion. Accordingly, also for this reason, the total required time can be effectively reduced.

An eighth embodiment of the present invention will now be described with reference to FIG. 18. Generally, the number of available colors in each pixel which is the minimum unit of image data corresponds to, in case of a natural image, such as a photograph image, the number of colors expressible by 24 bits in color image or the number of colors expressible by 8 bits in monochrome image. In other words, it is 24-bit tone or 8-bit tone. In a case of an image created artificially on the other hand such as an illustration, a graphic image, etc., it corresponds to the number of colors expressible by 1 through 8 bits in color image or the number of colors expressible by 1 through 4 bits in monochrome image. In other words, it is 1-8-bit tone or 1-4-bit tone. According to the fifth embodiment of the present invention, the number of available colors for each pixel in the original image data is set as a subject of the threshold by which the processing way is switched as mentioned above in the former embodiments Specifically, the number of available colors of an original image may be recognized by referring to a data format of the original image. Then, when it is determined that the original image has a 24-bit tone in color image or an 8-bit tone in monochrome image, it is determined that the original image is a natural image. Then in this case, a magnification or size-reduction processing is performed by the simple second processing way throughout the required rate of image magnification or size-reduction. Otherwise, when it is determined that the original image to be processed is an artificial image, such as a character/text image, graphic image, illustration or so, the required size-change processing is performed in the advanced first processing way throughout.

Figure 18:
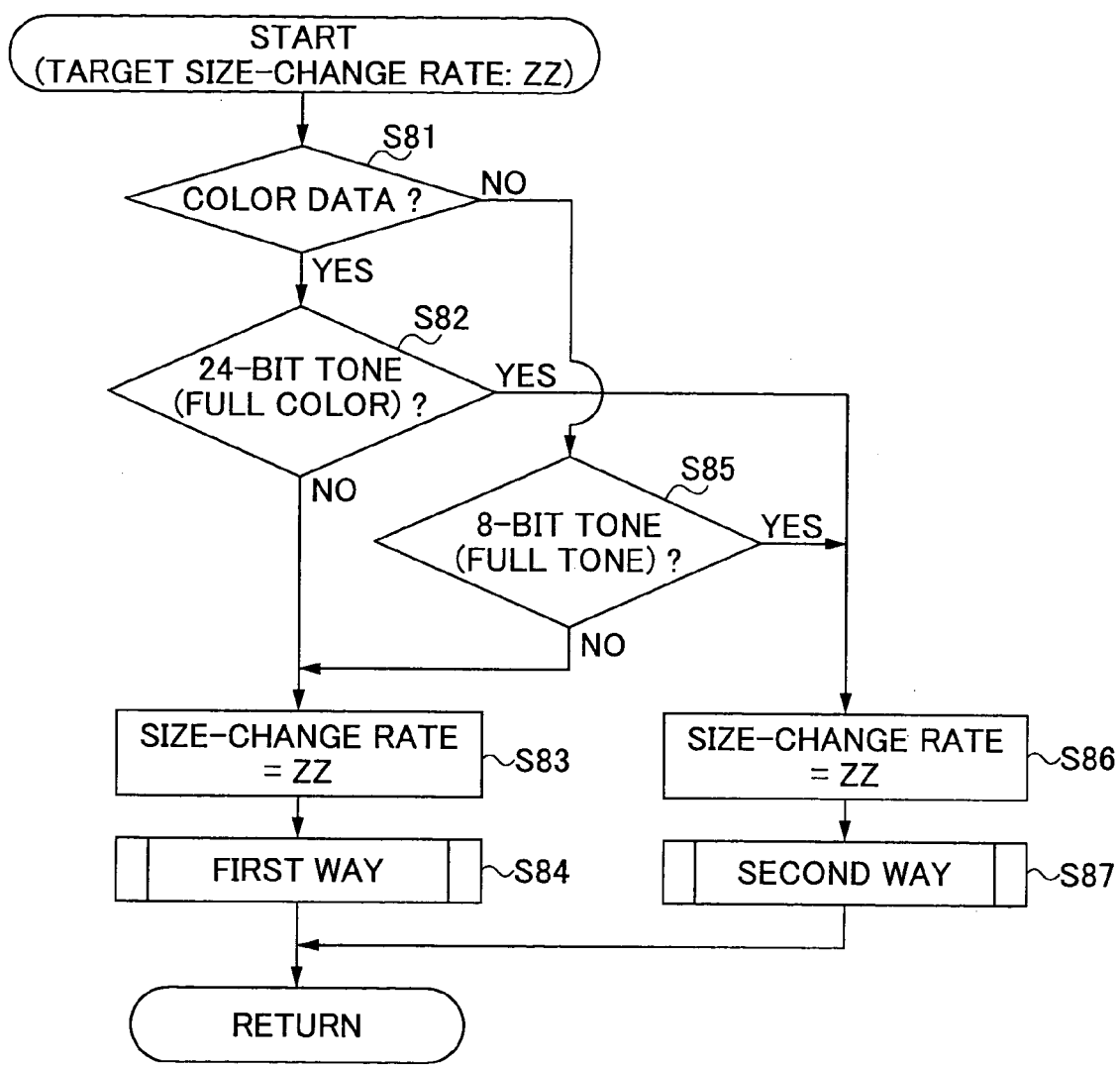
FIG. 18 shows an operation flow chart of a fifth embodiment of an image processing method according to the present invention.

As shown in FIG. 18, first, it is determined whether or not the target image data is color image data or monochrome image data. As a result, when it is determined as being color image data (No in Step S81), the number of usable bits per pixel is seen in Step S85. Specifically, it is determined whether or not the number of usable bits in the original image data is 8 bits. According to the above-mentioned example, in case of monochrome image, it is a full-tone image when the number of usable bits is 8. Accordingly, in this case, when it is found out that the given image data is of a full tone image, it is determined that the relevant image is a natural image as mentioned above. In this case, as described in the description of the third embodiment, the high-order first processing way including jaggy processing or so is not necessarily be effective to be applied. Accordingly, in this case, the simple processing way of simple pixel multiplication or pixel thinning out processing is applied (Steps S86 and S87).

On the other hand, otherwise (No of Step S85) (i.e., when it is detected that a small number of usable bits is applied), the original image is, in a higher possibility, an artificial image, such as a character/text image, and thus, there is a high possibility that an image degradation due to jaggy or Moiré is likely to become conspicuous. Therefore, the required size-change processing is carried out by the first processing way which includes advanced image processing, such as jaggy processing, throughout the required magnifying rate or size-reduction rate in this case (Steps S83 and S84).

Moreover, in a case of 24-bit full tone image data in case of color image (Yes of Step S82), the target image is determined as being a natural image in the determination of Step S81, the simple second processing way which does not include advanced image processing such as jaggy processing, is applied, as in the above-mentioned case of monochrome image (Steps S86 and S87). Otherwise (No of Step S82, i.e., a case of an artificial images, such as a graphic image), the first processing way of advanced image processing is applied (Steps S83 and S84).

Thus, in the fifth embodiment, a determination as to whether or not a given image is a natural image or so is made with a threshold which is switched according to whether the given image is a color image or a monochrome image. Therefore, in comparison to the scheme of the above-mentioned third embodiment, a given image can be discriminated finely at a further higher precision, and thus a suitable magnification or size-reduction processing way can be selected and applied. Consequently, the required processing time can be effectively reduced without lowering the quality of the original image more than necessary. Furthermore, although the threshed for an input image is related with a color of an original image as in the above-mentioned third embodiment, it is not necessary to calculate the actual number Nn of colors of an original image in numerical operation in advance according to the fifth embodiment. Accordingly, the processing time required for the determination on the input image can be effectively reduced.

Figure 19:
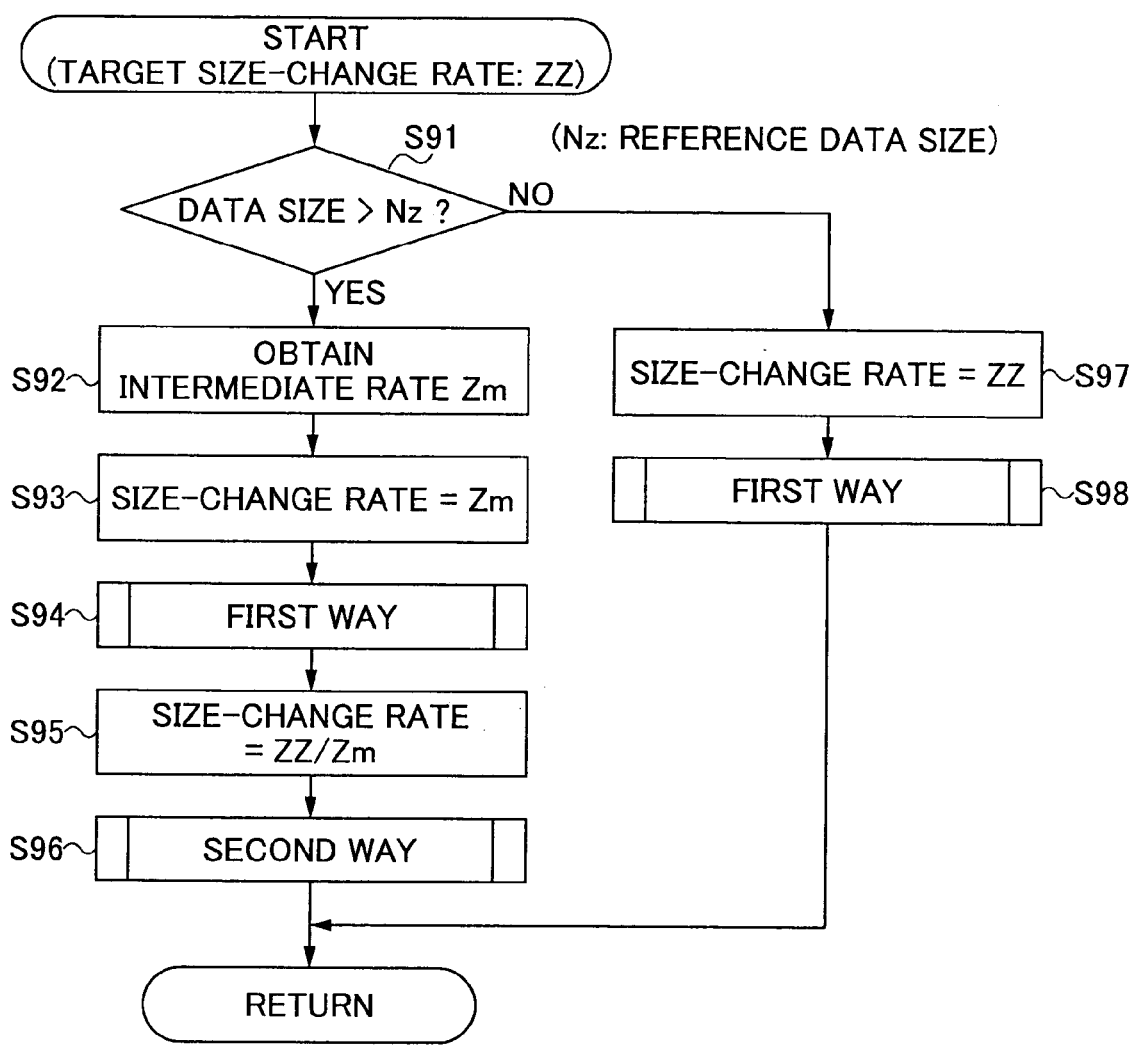
FIG. 19 shows an operation flow chart of a sixth embodiment of an image processing method according to the present invention.

Next, a configuration of a sixth embodiment of the present invention will now be described sixth reference to FIG. 19. Generally speaking, the processing time required increases accordingly as the image size of a give image becomes larger. Especially in a case where the above-mentioned first processing way which includes a high-order processing such as a jaggy processing is applied, the required processing time increases in proportion to the size of the relevant image. Accordingly, according to the sixth embodiment, the data size of a given image is applied as the threshold at which the processing way is switched as in the previous embodiments. When the size of the original image exceeds a reference value Nz (Yes in Step S91), the first processing way of high-order processing such as a jaggy processing or so is applied first for a predetermined intermediate size-change rate Zm (Steps S92, S93, and S94). Then, after that, for the remaining size-change rate portion (ZZ/Zm) Zm, i.e., from the intermediate size-change rate Zm to the final size-change rate ZZ, the second processing way of the simple magnification or simple thinning-out processing is applied (Steps S95 and S96)

The sixth embodiment is same as the above-mentioned first embodiment except for the matter as to how to determine the threshold for switching as to whether the size-change processing is performed first in the first processing way and after that in the second processing way, or the size-change processing is performed throughout in the first processing way. In this case, it is preferable that the above-mentioned intermediate size-change rate Zm is determined also by the above-mentioned 'intermediate size-change rate Zm determination method' described above with reference to FIG. 14 as in the above-mentioned first embodiment. As a result, it becomes possible to effectively control the required processing time. Accordingly, it becomes possible that a size-change processing for a required size-change rate can be achieved within a predetermined time duration regardless of the size of a given image, by appropriately selecting the intermediate size-change rate Zm according to the above-mentioned 'intermediate size-change rate Zm determination method'. Accordingly, it becomes possible to provide a best size-change processing within a time duration which a user can permit.

Figure 20:
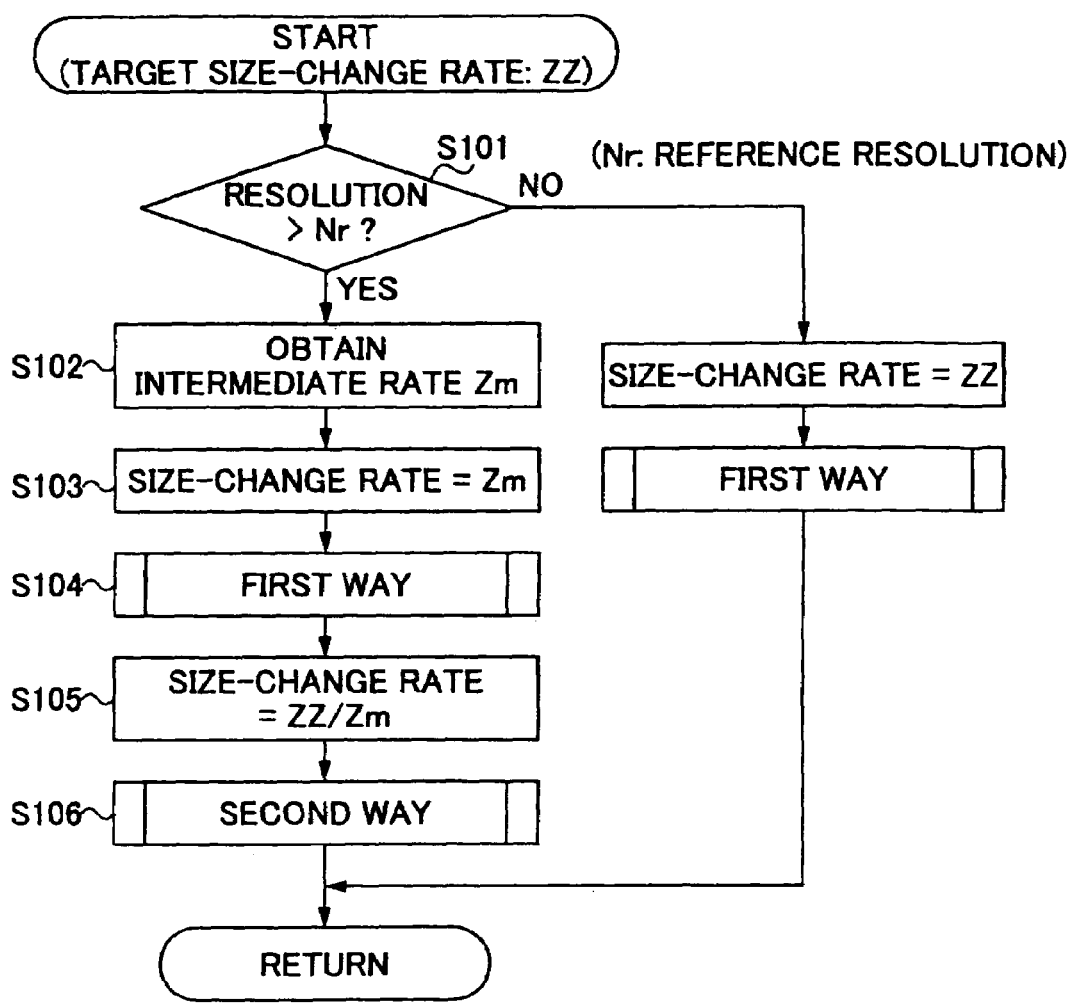
FIG. 20 shows an operation flow chart of a seventh embodiment of an image processing method according to the present invention.

Next, with reference to FIG. 20, a configuration of a seventh embodiment of the present invention will now be described.

Generally, since the size of image data becomes larger as the resolution thereof becomes higher, the required data processing time therefor becomes inevitably longer accordingly. According to the seventh embodiment, the resolution of a given image is applied as the threshold at which the processing way is switched. When the resolution of the original image to be processed exceeds a reference value Nr (Yes in Step S101), the first processing way of high-order processing such as a jaggy processing or so is applied for a predetermined intermediate size-change rate Zm (Steps S102, S103, and S104). Then, after that, for the remaining size-change rate portion (ZZ/Zm) Zm, i.e., from the intermediate size-change rate Zm to the final size-change rate ZZ, the second processing way of the simple magnification or simple thinning-out processing is applied (Steps S105 and S106)

Also the seventh embodiment is same as the above-mentioned first embodiment described above with reference to FIG. 12 except for the matter as to how to determine the threshold for switching as to whether the size-change processing is performed first in the first processing way and after that in the second processing way, or the size-change processing is performed throughout in the first processing way. Also in this case, it is preferable that the above-mentioned intermediate size-change rate Zm is determined by the above-mentioned 'intermediate size-change rate Zm determination method' described above with reference to FIG. 14 as in the above-mentioned first embodiment. As a result, it becomes possible to effectively control the required processing time. Accordingly, it becomes possible that a size-change processing for a required size-change rate can be achieved within predetermined time duration regardless of the size of a given image, by appropriately selecting the intermediate size-change rate Zm according to the above-mentioned 'intermediate size-change rate Zm determination method'. Accordingly, it becomes possible to provide a best size-change processing within a time duration which a user can permit.

The respective embodiments mentioned above may be provided separately, or may be provided in combination of any ones. Thus, any ones of the above-mentioned embodiments are combined in terms of functions thereof so as to form a single image processing apparatus, and there, a user may freely select any function corresponding to the respective one of the combined embodiments via an operation part such as an operation panel provided on the apparatus.

Thus, according to the present invention, a plurality of types of processing ways are appropriately combined for achieving a predetermined image processing on a given image. Thereby, a user can appropriately determine a sharing ratio among the thus-combined different types of processing ways to be applied freely in consideration of a desired image quality resulting from the processing, and a time required for achieving the processing. Accordingly, the problem can be solved which would otherwise occur in the related art, i.e., in a method of switching different types of processing ways by a threshold, and in case where, by accident, input data having a processing condition which is near the threshold, the processing quantity obtained and processing time required differ remarkably merely by a matter as to whether the processing condition is higher or lower than the threshold. Such a problematic situation can be avoided according to the present invention by appropriately controlling the above-mentioned sharing ratio among the different types of processing ways applied in combination.

Another idea is also contrivable for the purpose of solving the above-mentioned problem in which the processing quality obtained and processing time required remarkably differ depending on which of predetermined different processing ways is selected in the method of simply switching these predetermined different processing ways according to the related art. That is, a plurality of different processing ways may be prepared each having a processing condition which gradually differs finely from each other thereamoung. However, in order to realize this method, in order to enable fine adjustment of condition of processing applied, it would be necessary to increase the number of the different types of processing ways to be prepared accordingly, and, thus, a considerable complicated configuration may be required.

In contrast thereto, according to the present invention, by simply combine a plurality of arbitrary existing processing ways at an arbitrary sharing ratio, the effective can be obtained. Thus, it becomes possible to control the conditions of the processing actually applied finely by appropriately controlling the sharing ratio for making the conditions match the given requirements easily. A matter necessary to achieve the appropriate combination sharing ratio is merely to adjust a processing amount/rate (size-change rate, in the above-mentioned example) in each of the thus-combined processing ways according to the sharing ratio. Thus, according to the present invention, even with a simple configuration, a processing quality obtained and a processing time required for the entirety of a predetermined image processing can be easily controlled in a fine adjustment manner. Accordingly, it becomes possible to provide an image processing system which can positively respond to a variety of requirements.

For example, in response to various image processing requirements, where a processing time required is fixed, it becomes possible to provide a best image quality within the fixed processing time according to the present invention. In another way, it is also possible that, throughout the entirety of a required image processing process, a high-order processing way such as to effectively avoid jaggy phenomenon may be applied for a range of the processing such that image degradation such as jaggy will no longer occur after that, and, then, after that, a simple processing way is applied for the remaining range of the processing. Thereby, it becomes possible to obtain an image with appropriately controlled image degradation within the minimum processing time.

Thus, according to the present invention, in response to a variety of processing conditions such as an image size, the number of colors, a permissible processing time, and so forth, the entirety of predetermined processing is achieved in different processing ways which are combined in a predetermined combination sharing ratio. Thereby, it becomes possible to always provide an image processing within a desired processing time with a desired processing quality, in response to various processing conditions/requirements. Further, according to the present invention, it becomes possible to provide a method of image processing in which, a required processing time and/or an image quality obtained do not remarkably differ even the given condition is slightly higher or lower than a predetermined threshold (selection reference value for switching among different image processing ways). As a result, it becomes possible to provide an effective image processing efficiently in response to a characteristic of an original image, and, thus, it becomes possible to effectively reduce the required processing time.

Further, by executing selectively a plurality of processing processes having different characteristics respectively in response to the number of colors of an original image, it becomes possible to provide an effective image processing efficiently in response to the characteristic of the original image. As a result, it becomes possible to effectively reduce the required processing time. Also in this case by appropriately controlling the combination sharing ratio among the thus-combined plurality of processing processes having different characteristics, it becomes possible to achieve a scheme in that a required processing time and/or an image quality obtained do not remarkably differ merely according to the matter as to whether the given condition is slightly higher or lower than a predetermined threshold (selection reference value for switching different image processing processes).

Also, by executing selectively a plurality of processing processes having different characteristics respectively in response to a range of variation in pixel value (tone or shade) of an original image, it becomes possible to provide an effective image processing efficiently in response to the characteristic of the original image. As a result, it becomes possible to effectively reduce the required processing time. Also in this case by appropriately controlling the combination sharing ratio among the thus-combined plurality of processing processes having different characteristics, it becomes possible to achieve a scheme in that a required processing time and/or an image quality obtained do not remarkably differ merely according to the matter as to whether the given condition is slightly higher or lower than a predetermined threshold (selection reference value for switching different image processing processes).

Thus, according to the present invention, it becomes possible to provide an image processing apparatus and an image processing method which can flexibly respond to various conditions/requirements.

Further, the present invention is not limited to the above-described embodiments, and variations and modifications may be made without departing from the basic concept of the present invention.

The present application is based on Japanese priority applications Nos. 2002-201612, 2002-312183 and 2003-160942, filed on Jul. 10, 2002, Oct. 28, 2002, and Jun. 5, 2003, respectively, the entire contents of which are hereby incorporated by reference.

What is claimed is:

1. An image processing apparatus, comprising:
   a comparison part comparing an image information value which indicates predetermined image information of an original image, with a corresponding predetermined reference value which is previously set for each of the predetermined image information; and
   a sharing-ratio determining part which, based on a comparison result of said comparison part, determines a sharing ratio for sharing processing resources between a first processing way and a second processing way different from said first processing way, for changing a size of image data, wherein:
   said sharing-ratio determining part calculates the sharing ratio, and adjusts the sharing ratio in the processing between the first and second processing ways so that the entire process of a predetermined image size-change processing is completed within a given time duration, if a processing time for performing the entire processing of the predetermined image size-change processing utilizing the first processing way but not the second processing way exceeds the given time duration,
   the image processing apparatus includes a print function, and
   the adjustment of the sharing ratio is made in such a manner that the sharing ratio is gradually changed, a required time duration is calculated every time of the gradual changing of the sharing ratio, the thus-calculated required time duration is compared with the given time duration, and then, the sharing ratio at which the comparison result indicates that the required time duration corresponds to the given time duration is obtained.

2. The image processing apparatus as claimed in claim 1, wherein:
   said first processing way for changing the size of the image data comprises a way for achieving a high-order image processing for controlling image degradation.

3. The image processing apparatus as claimed in claim 1, wherein:
   said second processing way comprises a way of simply changing the number of pixels without changing the respective pixel values.

4. The image processing apparatus as claimed in claim 1, wherein:
   said comparison part compares an image data size-change rate required with a predetermined reference value instead of comparing the predetermined image information value of the original image.

5. The image processing apparatus as claimed in claim 1, wherein:
   the information of the image in formation value and predetermined reference value, compared by said comparison part, comprises information concerning the data size of the original image.

6. The image processing apparatus as claimed in claim 1, wherein:
   the information of the image information value and predetermined reference value, compared by said comparison part, comprises information concerning the number of colors expressible by each pixel of the original image.

7. The image processing apparatus as claimed in claim 1, wherein:
   the information of the image information value and predetermined reference value, compared by said comparison part, comprises information concerning the resolution of the original image.

8. The image processing apparatus as claimed in claim 1, wherein:
   the information of the image information value and predetermined reference value, compared by said comparison part, comprises information as to whether or not the original image is a color image or a monochrome image.

9. The image processing apparatus as claimed in claim 1, wherein:
   the sharing ratio between the first arid second processing ways is determined based in part on a predetermined attribute of the original image.

10. The image processing apparatus as claimed in claim 9, wherein:
    the predetermined attribute of the original image which is used for determining the sharing ratio by said sharing-ratio determining part comprises the number of used colors in the original image.

11. The image processing apparatus as claimed in claim 1, wherein:
    the sharing ratio between the first and second processing ways is determined according to said given time duration for completing the entire process of a relevant image size-change processing.

12. The image processing apparatus as claimed in claim 1, wherein:
    said first processing way comprises a process for preventing a jaggy from becoming conspicuous.

13. The image processing apparatus as claimed in claim 1, wherein:
    the sharing ratio between the first and second processing ways is determined by said sharing-ratio determining part based in part on the contents of image processing in the entire process of a relevant image size-change processing.

14. The image processing apparatus as claimed in claim 1, wherein an application of the first and second processing ways is made in such a manner that one of the first and second processing way is applied, and, after that, the other processing way is applied.

15. The image processing apparatus as claimed in claim 14, wherein the application of the first and second processing ways is made in such a manner that one of the first and second processing way, which one requires a longer processing time, is applied first, and, after that, the other processing way is applied.

16. The image processing apparatus as claimed in claim 1, wherein an application of the first and second processing ways is made in such a manner that one of a first mode and a second mode is selected according to a comparison result of said comparison part,
wherein said first mode is such that both said first and second processing ways are applied in a combination manner, and said second mode is such that only one of the first and second processing ways is applied.

17. The image processing apparatus as claimed in claim 16, wherein said second mode is such that only one of the first and second processing way, which one requires a longer processing time, is applied.

18. The image processing apparatus as claimed in claim 1, wherein:
said first processing way comprises an image size-change processing for an integer size-change rate, and said second processing way comprises an image size-change processing for a size-change rate which includes a fraction.

19. An image processing method for changing the size of image data of an original image, comprising:
a comparison step comparing an image information value which indicates predetermined image information of the original image, with a corresponding predetermined reference value which is previously set for each of the predetermined image information; and
a sharing-ratio determining step, based on a comparison result of said comparison step, determining a sharing ratio for sharing processing resources between a first processing way and a second processing way different from said first processing way, in processing for changing the size of the image data, wherein:
said sharing-ratio determining step comprises calculating the sharing ratio, and adjusting the sharing ratio in the processing between the first and second processing ways so that the entire process of a predetermined image size-change processing is completed within a given time duration, if a processing time for performing the entire processing of the predetermined image size-change processing utilizing the first processing way but not the second processing way exceeds the given time duration,
said sharing-ratio determining step is performed in an apparatus having a print function, and
the adjustment of the sharing ratio is made in such a manner that the sharing ratio is gradually changed, a required time duration is calculated every time of the gradual changing of the sharing ratio, the thus-calculated required time duration is compared with the given time duration, and then, the sharing ratio at which the comparison result indicates that the required time duration corresponds to the given time duration is obtained.

20. The image processing method as claimed in claim 19, wherein:
said first processing way for changing the size of the image data comprises a way for achieving a high-order image processing for controlling image degradation.

21. The image processing method as claimed in claim 19, wherein:
said second processing way comprises a way of simply changing the number of pixels without changing the respective pixel values.

22. The image processing method as claimed in claim 19, wherein:
in said comparison step, an image data size-change ratio required is compared with a predetermined reference value instead of comparing the predetermined image information value of the original image.

23. The image processing method as claimed in claim 19, wherein:
the information of the image information value and predetermined reference value which is applied in said comparison step for comparison comprises information concerning the data size of the original image.

24. The image processing method as claimed in claim 19, wherein:
the information of the image information value and predetermined reference value which is applied an said comparison step comprises information concerning the number of colors expressible by each pixel of the original image.

25. The image processing method as claimed in claim 19, wherein:
the information of the image information value and predetermined reference value which is applied in said comparison step comprises information concerning the resolution of the original image.

26. The image processing method as claimed in claim 19, wherein:
the information of the image information value and predetermined reference value which is applied in said comparison step comprises information as to whether or not the original image is a color image or a monochrome image.

27. The image processing method as claimed in claim 19, wherein:
the sharing ratio between the first and second processing ways is determined based in part on a predetermined attribute of the original image.

28. The image processing method claimed in claim 27, wherein:
the predetermined attribute of the original image which is used for determining the sharing ratio in said sharing-ratio determining step comprises the number of used colors in the original image.

29. The image processing method as claimed in claim 19, wherein:
the sharing ratio between the first and second processing ways is determined according to said given time duration for completing the entire process of a relevant image size-change processing.

30. The image processing method as claimed in claim 19, wherein:
said first processing way comprises a process for preventing a jaggy from becoming conspicuous.

31. The image processing method as claimed in claim 19, wherein:
the sharing ratio between the first and second processing ways is determined in said sharing-ratio determining step based in part on the contents of image processing in the entire process of a relevant image size-change processing.

32. The image processing method as claimed in claim 19, wherein an application of the first and second processing ways is made in such a manner that one of the first and second processing way is applied, and, after that, the other processing way is applied.

33. The image processing method as claimed in claim 32, wherein the application of the first and second processing ways is made in such a manner that one or the first and second processing way, which one requires a longer processing time, is applied, and, after that, the other processing way is applied.

34. The image processing method as claimed in claim 19, wherein an application of the first and second processing ways is made in such a manner that one of a first mode and a second mode is selected according to a comparison result of said comparison step, wherein said first mode is such that both said first and second processing ways are applied in a combination manner, and said second mode is such that only one of the first and second processing ways is applied.

35. The image processing method as claimed in claim 34, wherein said second mode is such that only one of the first and second processing way, which one requires a longer processing time, is applied.

36. The image processing method as claimed in claim 19, wherein:

said first processing way comprises an image size-change processing for an integer size-change rate, and said second processing way comprises an image size-change processing for a size-change rate which includes a fraction.

37. A computer readable medium storing computer executable instructions causing a computer to execute each step of the method claimed in claim 19.

38. A computer readable medium storing computer executable instructions causing a computer to execute each step of the method claimed in claim 20.

39. A computer readable medium storing computer executable instructions causing a computer to execute each step of the method claimed in claim 21.

40. A computer readable medium storing computer executable instructions causing a computer to execute each step of the method claimed in claim 22.

41. A computer readable medium storing computer executable instructions causing a computer to execute each step of the method claimed in claim 23.

42. A computer readable medium storing computer executable instructions causing a computer to execute each step of the method claimed in claim 24.

43. A computer readable medium storing computer executable instructions causing a computer to execute each step of the method claimed in claim 25.

44. A computer readable medium storing computer executable instructions causing a computer to execute each step of the method claimed in claim 26.

45. A computer readable medium storing computer executable instructions causing a computer to execute each step of the method claimed in claim 27.

46. A computer readable medium storing computer executable instructions causing a computer to execute each step of the method claimed in claim 28.

47. A computer readable medium storing computer executable instructions causing a computer to execute each step of the method claimed in claim 29.

48. A computer readable medium storing computer executable instructions causing a computer to execute each step of the method claimed in claim 30.

49. A computer readable medium storing computer executable instructions causing a computer to execute each step of the method claimed in claim 31.

50. A computer readable medium storing computer executable instructions causing a computer to execute each step of the method claimed in claim 32.

51. A computer readable medium storing computer executable instructions causing a computer to execute each step of the method claimed in claim 33.

52. A computer readable medium storing computer executable instructions causing a computer to execute each step of the method claimed in claim 34.

53. A computer readable medium storing computer executable instructions causing a computer to execute each step of the method claimed in claim 35.

54. A computer readable medium storing computer executable instructions causing a computer to execute each step of the method claimed in claim 36.

\* \* \* \* \*